(12) United States Patent
Atkinson et al.

(10) Patent No.: US 8,973,829 B2
(45) Date of Patent: Mar. 10, 2015

(54) SYSTEMS AND METHODS FOR MANAGING ACCESS TO BENEFITS ASSOCIATED WITH PRODUCTS

(71) Applicant: DVDCase, Inc., Calgary (CA)

(72) Inventors: Paul D. Atkinson, Poway, CA (US); Charles A. White, Oakland, CA (US)

(73) Assignee: DVDCase, Inc., Calgary (CA)

( * ) Notice: Subject to any disclaimer, the term of this patent is extended or adjusted under 35 U.S.C. 154(b) by 101 days.

(21) Appl. No.: 13/800,960

(22) Filed: Mar. 13, 2013

(65) Prior Publication Data

US 2013/0191233 A1 Jul. 25, 2013

Related U.S. Application Data

(63) Continuation-in-part of application No. 13/405,227, filed on Feb. 24, 2012.

(60) Provisional application No. 61/727,662, filed on Nov. 16, 2012, provisional application No. 61/446,390, filed on Feb. 24, 2011, provisional application No. 61/489,622, filed on May 24, 2011, provisional application No. 61/500,185, filed on Jun. 23, 2011, provisional application No. 61/638,041, filed on Apr. 25, 2012, provisional application No. 61/652,967, filed on May 30, 2012.

(51) Int. Cl.
| | | |
|---|---|---|
| *G06K 19/00* | (2006.01) | |
| *G06F 21/10* | (2013.01) | |
| *G06F 21/62* | (2013.01) | |
| *G06K 19/06* | (2006.01) | |
| *G06K 19/10* | (2006.01) | |
| *G06Q 20/12* | (2012.01) | |
| *G06Q 20/20* | (2012.01) | |

(52) U.S. Cl.
CPC ............ *G06F 21/10* (2013.01); *G06F 21/6218* (2013.01); *G06K 19/06018* (2013.01); *G06K 19/06037* (2013.01); *G06K 19/10* (2013.01); *G06Q 20/1235* (2013.01); *G06Q 20/202* (2013.01)
USPC ............ 235/487; 235/494; 235/454; 235/435

(58) Field of Classification Search
CPC .............. G06Q 30/0609; G06Q 30/02; G06Q 30/0207; G06Q 30/0209; G06Q 30/0225; G06Q 30/0234; G06Q 30/0236; G06Q 30/0238; G06F 21/10; G06F 2221/2117; H04N 21/6334
USPC ................................. 235/487, 494, 454, 435
See application file for complete search history.

(56) References Cited

U.S. PATENT DOCUMENTS 6,069,955 A * 5/2000 Coppersmith et al. .......... 380/54
2008/0163055 A1 * 7/2008 Ganz et al. .................... 715/706

OTHER PUBLICATIONS

Office Action Dated Aug. 26, 2014 for corresponding U.S. Appl. No. 13/801,015.
Office Action Dated Sep. 12, 2014 for corresponding U.S. Appl. No. 13/801,038.

* cited by examiner

*Primary Examiner* — Kristy A Haupt
(74) *Attorney, Agent, or Firm* — Goodwin Law

(57) ABSTRACT

Systems and methods for managing access to electronic products are described. In an embodiment, a system implemented method includes receiving, from a source, a first code associated with an item; receiving, from another source, another first code and a second code associated with the item; evaluating the first code with the another first code; associating the second code with the first code based on a result from the evaluating; identifying an access key, and transmitting the access key to the second source, the access key is for accessing one or more rights associated with the item.

19 Claims, 23 Drawing Sheets

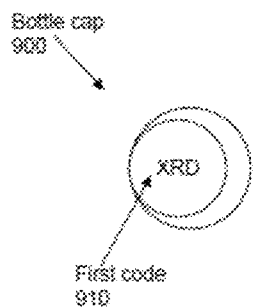
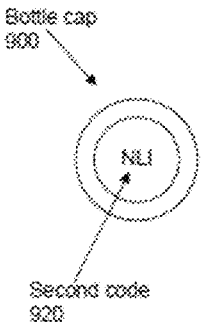
FIG. 9A    FIG. 9B
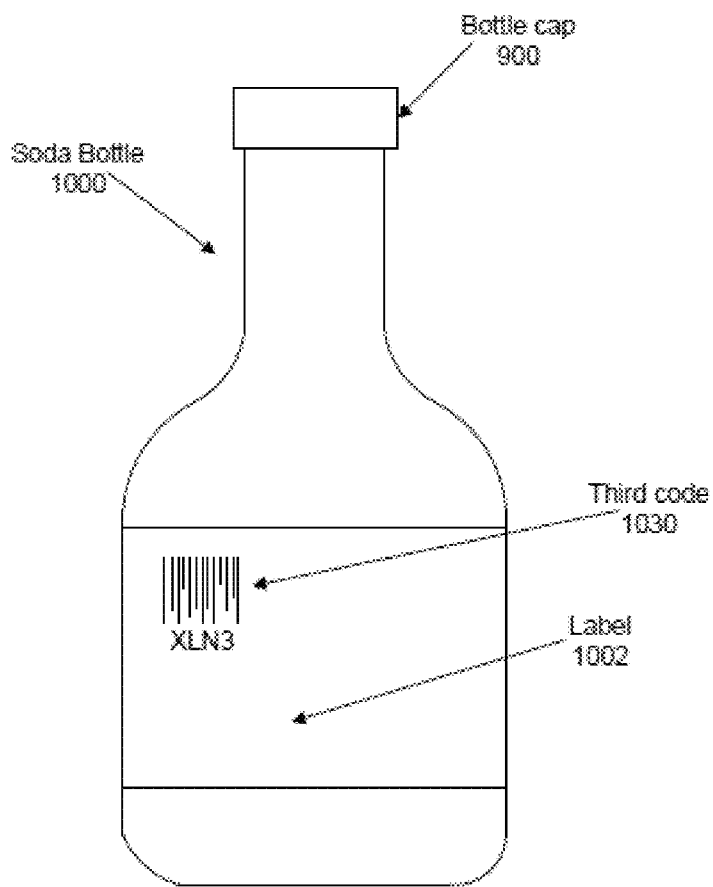
FIG. 10

SYSTEMS AND METHODS FOR MANAGING ACCESS TO BENEFITS ASSOCIATED WITH PRODUCTS

CROSS-REFERENCE TO RELATED APPLICATIONS

This application is related to U.S. patent application Ser. No. 13/405,227, entitled "System and Method for Authorizing a Right or Benefit" and filed Feb. 24, 2012, the entirety of which is hereby incorporated herein by reference as if set forth in full.

The U.S. patent application Ser. No. 13/405,227 claims the benefit of U.S. Provisional Application Ser. No. 61/446,390, filed Feb. 24, 2011, U.S. Provisional Application Ser. No. 61/484,995, filed May 11, 2011, and U.S. Provisional Application Ser. No. 61/500,185, filed Jun. 23, 2011, the contents of all three provisional application are incorporated herein by reference in their entireties as if set forth in full.

BACKGROUND

1. Field

The embodiments described herein relate generally to the field of secured access technologies, and, more particularly, to systems and methods for managing access to benefits, such as digital rights, associated with a purchased product.

2. Related Background

In the retail industry it is often desirable to provide a benefit to a consumer that is dependent on a particular item being sold. In some cases, the benefit may be a "right" to access media content (e.g., a downloadable copy of a motion picture), where such a right is authorized only after the product has been sold. In other cases, the benefit may simply refer to some feature, advantage, or provision associated with either the actual product for sale, the manufacturer or retailer selling the product, or a particular geographic region where the product is being sold (e.g., special features, rewards, warranties, return policies, promotional or exclusive offers, complementary goods, repair or maintenance policies, off-site merchandise, etc.).

However, with existing solutions, there is often a risk that the benefit may be claimed or accessed by someone other than the original purchaser due to illicit acquisition of an access code contained within the product being sold or within its packaging. In many instances, merchandise within the store may be opened and the access code photographed or otherwise records. This activity often remains undetected as the merchandise may be subsequently reassembled, appearing as if its contents have not been compromised.

Certain conventional techniques utilize a code comprising a human-readable text string, machine-readable code, or a symbology (such as a bar code or Quick Response (QR) code) that remains hidden while the item is sold. For example, some codes may be concealed within areas intended to be scratched off or otherwise peeled away. In other cases, the code may be printed on the inside of the merchandise and is accessible only after the product or product packaging has been opened (e.g., a code printed on the inside of a bottle cap or on an insert of an optical disc case.) To varying degrees, each of these methods relies on the consumer or merchant properly identifying and rejecting any merchandise appearing to have been compromised or potentially accessed by an unauthorized party prior to the item being purchased (e.g., as when a bottle cap appears to have been already removed from the bottle, when the scratch layer of a gift card appears to have been tampered with, when the seal on an optical disc case has been removed or otherwise compromised). However, the access codes of many such products may be compromised and then returned to store shelves. Absent evidence of tampering, an unsuspecting purchaser may wind up purchasing the item, only to later discover that the access code has already been used and is thus no longer valid.

Another drawback of utilizing only a single, unique, "hidden" code is that such systems do not enable the tracking of individual items sold at particular retailers. A stock-keeping unit (SKU) code may be affixed to merchandise, but such a code only describes the category of item being sold, as opposed to any individual unit contained within that category. This prevents manufacturers, distributors, and retailers from attaching certain benefits (e.g., rights) only to items sold at particular stores or within particular geographic regions. In other words, tracking SKU codes does not allow merchandise to be traced back to a particular store or geographic region.

Additionally, without authorization of particular items at the point-of-sale location, there is an increased risk that an unauthorized party will utilize a script or other program to test a large number codes in order to identify a subset of authorized codes. In addition, if a specific mathematical function has been used to generate each code, key generators may be derived and distributed all across the Internet. This enables potentially hundreds of thousands of unauthorized individuals to access the included benefit.

Some conventional techniques utilize only a point-of-sale code, such as a human-readable text string, machine-readable code, barcode, or QR code. However, this technique also presents various complications. In cases where the product may only be activated at the point-of-sale, this requires the store to maintain a continually active network connection. Otherwise, the consumer is forced to wait for some period for a delayed activation. In other cases, the access code must remain visible to the line-of-sight of a bar-code scanner. With the code being visible on the product packaging itself, illicit acquisition of the code may be a concern.

Radio Frequency Identification (RFID) tags are another means of attempting to securely provide the information, but these tags are relatively expensive compared to optical codes. These devices are also costly to embed within products, and require either that consumers have RFID readers with which to read the "hidden code" after the item has been purchased, or otherwise require significant infrastructure upgrades throughout the supply chain.

What is needed is a tamper-evident system of securing access to benefits, such as rights, that are included with the purchase of a product. Ideally, the system will be less expensive than RFID technology, and yet less susceptible to fraud or exploitation than conventional hidden-code or point-of-sale systems (or a combination thereof). Additionally, the system should also enable manufacturers, distributors, and retailers to attach localized benefits (e.g., rights) to individual items of a single category of products that are being sold at different dates and/or times, at different stores, or within different geographic locations.

SUMMARY

Accordingly, systems and methods are disclosed for securing access to benefits associated with purchased products. In an embodiment, packaging for a product, such as an optical disc (e.g., Blu-ray disc) or other electronic device (e.g., laptop computer), is labeled with a unique first code. When the product is purchased, the first code may be read at a point-of-sale, and transmitted to authentication server(s), which store the first code. After the product is opened and/or when the product is first utilized by the purchaser of the product, the first code and a second code, which is internal to the product or packaging, are transmitted to the authentication server(s). In certain embodiments, the second code may be a code printed on an internal region or insert of the product packaging or on the product itself (e.g., electronically inscribed in a machine-readable region of the product, such as Burst Cutting Area of a Blu-ray disc). The authentication server(s) may then compare the first code to stored first codes to verify that the product was obtained through a valid purchase transaction at a point-of-sale. If so, the purchaser may be provided with benefits or offers of benefits, such as access rights, associated with the product. For example, the purchaser may be provided access to content on a Blu-ray disc or access to a laptop computer. In addition, the authentication server(s) may store an association between the first code and the second code for subsequent utilization of the product and retailer-specific communications.

In an embodiment, at least two code may be included upon a substrate to be inserted or affixed to a product, or alternatively, upon a surface or material of the product or its packaging. The respective codes may together form a unique code which maps to a set of rights or benefits intended to be conferred upon a consumer. The codes may be duplex printed upon the substrate or product material in order to curb or eliminate matching errors. In other embodiments, one code may be printed on an externally visible region of a product packaging, and the other code may be printed within the product packaging or on the product itself (e.g., in a Burst Cutting Area of a Blu-ray disc), and may be human-readable and/or machine-readable.

In some embodiments, the substrate or product material may be selected, configured, or assembled so as to readily evidence product tampering. Various embodiments advantageously enable product localization (e.g., association of a purchased product with the retailer or retail location that the product was sold) without the collection of personal information from the consumer, while simultaneously curbing illicit access from unauthorized parties to the set of rights or benefits that are included with the sale of the product.

In a first exemplary aspect, a substrate is disclosed. The substrate contains identifiers used for securing access to a benefit included with the sale of a product. In one embodiment, the substrate comprises a first identifier disposed upon a first surface of the substrate; and a second identifier disposed upon a second surface of the substrate, the first and second identifiers being duplex printed on the substrate and configured to form a unique identifier which maps to a set of one or more rules at a remote computing device; wherein the substrate is configured to be disposed within a container associated with the product such that the second identifier is visible or readable only when the container has been opened.

In a second exemplary aspect, a material is disclosed. The material bears identifiers used for securing access to a benefit included with the sale of a product. In one embodiment, the material comprises a first identifier disposed upon a first surface of the material, and a second identifier disposed upon a second surface of the material, the first and second identifiers being duplex printed on the material and configured to form a unique identifier which maps to a set of one or more rules at a remote computing device; wherein the material is configured to form at least a portion of the product and is positioned such that the second identifier is visible only when the product has been opened.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

The details of various embodiments, both as to its structure and operation, may be gleaned in part by study of the accompanying drawings, in which like reference numerals refer to like parts, and in which:

FIG. 9A illustrates the top of an example bottle cap bearing a first and second code, according to an embodiment;

FIG. 9B illustrates the underside of the bottle cap depicted in FIG. 9A, according to an embodiment;

FIG. 10 illustrates a soda bottle containing a label bearing an example third code, according to an embodiment;

DETAILED DESCRIPTION

In an embodiment, systems and methods are disclosed for managing access to benefits associated with products. For example, the products may be electronic products, such as content on Blu-ray discs, a laptop computer, and the like. Alternatively, the products may be physical products, such as soda.

System Overview

Figure 1A:
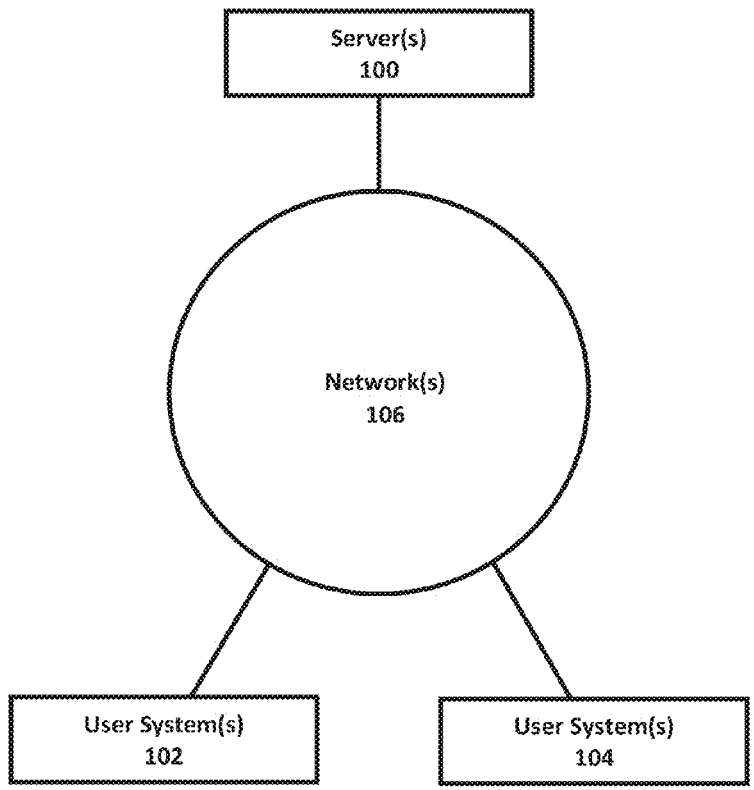
FIG. 1A illustrates an example system for managing rights or benefits for a purchased product, according to an embodiment.

FIG. 1A illustrates an example system for managing rights or benefits for a purchased product, according to an embodiment. The system may comprise a set of one or more servers 100 which host and/or execute one or more of the various functions, processes, and/or software modules described herein. In addition, the server(s) 100 are communicatively connected to one or more user systems 102 and/or 104 via one or more network(s) 106. Network(s) 106 may comprise the Internet, and server(s) 110 may communicate with user system(s) 102/104 through the Internet using standard transmission protocols, such as Hypertext Transfer Protocol (HTTP), Secure HTTP (HTTPS), File Transfer Protocol (FTP), and the like. In an embodiment, server(s) 110 may not be dedicated servers, and may instead be cloud instances, which utilize shared resources of one or more servers. Furthermore, while FIG. 1A illustrates the server(s) 100 being connected to various systems through a single set of network(s) 106, it should be understood that the server(s) 100 may be connected to the various systems via different sets of one or more networks. For example, the server(s) 100 may be connected to a subset of user systems 102 via the Internet, but may be connected to one or more other user systems 102/104 via an intranet. It should also be understood that user system(s) 102/104 may comprise any type or types of computing devices capable of wired and/or wireless communication, including without limitation, desktop computers, laptop computers, tablet computers, smart phones or other mobile phones, servers, point-of-sale devices (e.g., barcode wand or other scanner, cash register, etc.), game consoles, televisions, set-top boxes, electronic kiosks, and the like. In addition, while only a couple user systems 102/104 and one set of server(s) 100 are illustrated, it should be understood that the network may comprise any number of user systems and sets of server(s). Furthermore, the term "user" as used herein may refer to any individual utilizing a user device, such as a cashier or other employee or agent of a merchant, as well as a consumer of a product.

Server(s) 100 may comprise web servers which host one or more websites or web services. In embodiments in which a website is provided, the website may comprise one or more user interfaces, including, for example, webpages generated in Hypertext Markup Language (HTML) or other language. The server(s) 100 transmit or serve these user interfaces in response to requests from user system(s) 102/104. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to server(s) 100 and the responses from server(s) 100, including the user interfaces, may both be communicated through network(s) 106, which may include the Internet, using standard communication protocols (e.g., HTTP, HTTPS). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like. The server(s) may also respond to other requests from the user system(s) 102/104. For example, a user system may submit data (e.g., user data, form data, etc.) to be stored in one or more databases (not shown) locally and/or remotely accessible to the server(s) 100. Any suitable database may be utilized, including without limitation MySQL, Oracle, IBM, Microsoft SQL, Sybase, Access, and the like, including cloud-based database instances. Data may be sent to the server(s) 100, for instance, using the well-known POST request supported by HTTP. This data, as well as other requests, may be handled, for example, by server-side web technology, such as a servlet, executed by the server(s) 100.

In embodiments in which a web service is provided, the server(s) 100 may receive requests from user system(s) 102/104, and provide responses in eXtensible Markup Language (XML) and/or any other suitable or desired format. In such embodiments, the server(s) 100 may provide an application programming interface (API) which defines the manner in which user system(s) 102 may interact with the web service. Thus, the user system(s) 102/104, which may themselves be servers, can define their own user interfaces, and rely on the web service to implement the backend processes, functionality, storage, etc., described herein.

Figure 1B:
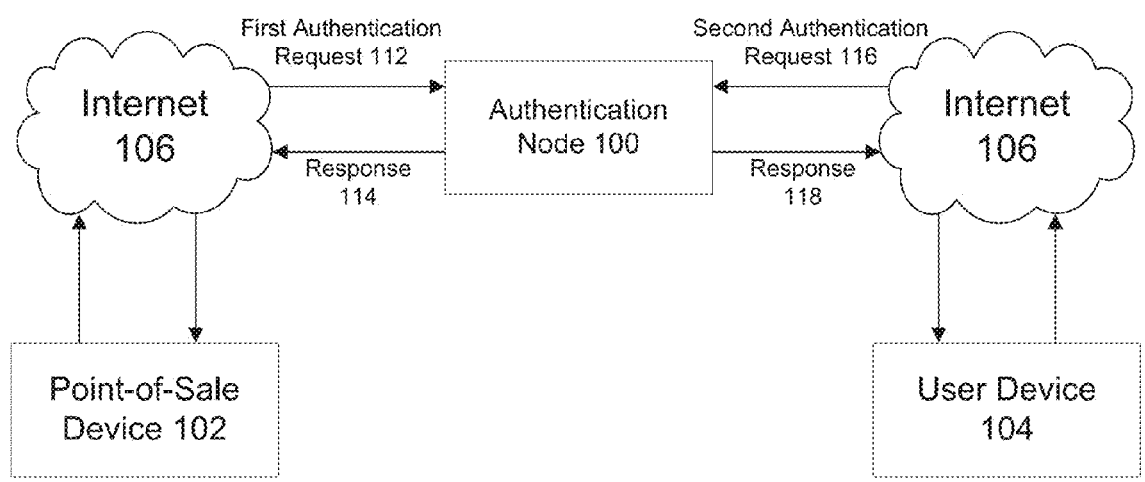
FIG. 1B is a block diagram illustrating an exemplary network configuration which may be used to trigger a set of one or more rules which map to a unique code according to an embodiment.

FIG. 1B is a block diagram illustrating an exemplary network configuration which may be used to trigger a set of one or more rules which map to a unique code, according to an embodiment. In some embodiments, the rules may enable a benefit to be enabled for a product, such as content to be unlocked within a digital medium or downloaded or streamed over a connected network. In other embodiments, the rules may trigger the delivery or provision of one or more benefits that have been included with the purchase of a product (e.g., special features, rewards, warranties, return policies, promotional or exclusive offers, complementary goods, repair or maintenance policies, off-site merchandise for delivery, etc.).

Various embodiments advantageously allow for the delivery or provision of one or more rights or other benefits to the consumer, without necessarily requiring the consumer to submit personal, private, or confidential information in order to receive the benefit. At the same time, various embodiments may also allow for product localization. That is to say, a manufacturer, distributor, merchant, or retailer can assign different sets of benefits to different groupings of the same model or type of product currently being offered for sale. For example, a high-definition LCD television sold in Cincinnati may include a delivery package offering discounts to local retail chains selling Bengal memorabilia, or alternatively, the purchase may enable the consumer to access downloadable content related to the Cincinnati Bengals. If the same television was sold in San Diego, the package may instead include discounts to Charger memorabilia or downloadable content related to the San Diego Chargers.

Note also that benefits may also be assigned based on vendor, rather than (or in addition to) being predicated upon the geographic area. For example, a television sold at Best Buy may include a benefit that would not otherwise be included if the same television were purchased at a different retailer.

As illustrated by FIG. 1B, point-of-sale device 102 and user device 104 are connected to authentication node 100 by network connection 106, such as the Internet. It should be noted here that for the purposes of FIG. 1B, and with respect to subsequent figures, the "authentication" of a constituent portion of an access code is best conceived of as something separate from that triggering a rule which would allow for the delivery or provision of one or more rights or other benefits that are included with a product for sale (which might also be conceived as a form of "authentication"). Authentication of an access code or constituent portion of access code may require searching through a data structure (such as a database, file, array, list, queue, stack, tree, hash table, heap, etc.) in order to identify the existence of that access code or constituent portion of access code in the data structure. In embodiments which utilize multiple access codes or constituent portions of the same access code, the set of rules may be triggered only when each of the multiple access codes or constituent portions of an access code have been successfully authenticated.

When an item is purchased, a code reader integrated with or in electrical communication with point-of-sale device 102 may read a first code that may be externally visible on the packaging, an external surface of a product, or other visible portion associated with a product. In this case, the first code is machine-readable, and may also be human-readable. Alternatively or additionally, the first code may be manually input using an input device (e.g., a keyboard, mouse, touch panel, or microphone) associated with point-of-sale device 102. In this case, the first code is human-readable, and may also be machine-readable.

In either case, the point-of-sale device 102 receives the first code and may transmit the first code to authentication node 100 in a first authentication request 112. Point-of-sale device 102 may be a device associated with an authorized first party, such as a merchant or retailer, with the means to receive and transmit the first code to authentication node 100, which may comprise or be communicatively coupled to a key registry. For example, point-of-sale device 102 may comprise or be integrated with a counter-top barcode reader and have access to the Internet 106.

Authentication node 100 receives a first authentication request 112 from point-of-sale device 102. First authentication request 112 may comprise the first code received by point-of-sale device 102. Authentication node 100 may then generate a response 114, which may be transmitted back to point-of-sale device 102. Response 114 serves to indicate whether authentication of the first code identifier was successful or unsuccessful. Optionally, an acknowledgement number or receipt may be provided to the merchant and/or consumer, which serves as evidence that the authentication of the first code has been performed successfully.

In an embodiment, a second code may also be included with the purchased item. In some embodiments, this second code is only visible to a consumer when the package has been opened (e.g., unfolded or had its shrink-wrap punctured or removed). This second code may be a human-readable code that is manually input into a user device 104 by the consumer, and subsequently transmitted to authentication node 100 via the Internet 106. For example, the second code may comprise a string of characters to be input into a personal computer with an Internet connection. In other embodiments, the code may be a machine-readable code requiring an associated scanner, imager, or other such reading device (e.g., a mobile phone executing an application capable of imaging and/or translating a QR code).

In embodiments, which utilize just the first code, the first code may uniquely map to a set of one or more rights or other benefits. In embodiments which utilize two codes, the combination of the first code and the second code uniquely maps to a set of one or more rights or other benefits. In such embodiments, the first code and/or the second code may themselves be unique in addition to the combination of both codes. In addition, the first code and second code may both be generated randomly (or pseudo-randomly) in order to prevent a functional relationship between the two codes from being established by an outside party. Also, according to some embodiments, a newly generated first code may be tested against a list or other data structure of previously generated first codes and discarded in the event that the same code has been previously generated and included in the list.

Returning to FIG. 1B, a second authentication request 116 may be generated at user device 104 and subsequently transmitted to authentication node 100. In embodiments which utilize just a first code, the second authentication request 116 may comprise the first code. In embodiments which utilize a first code and second code, the second authentication request 116 may comprise the second code or both the first code and second code. In some embodiments, authentication node 100 may transmit a response 118 to user device 104 indicating whether the first code and/or second code has been successfully authenticated. Once the codes from both the first authentication request and second authentication request have been successfully authenticated, the rule may then be triggered so as to confer or offer the right or other benefit associated with a product. For example, in some embodiments, one or more functions associated with media content may be unlocked or offered. For example, if the product purchased or otherwise obtained at the merchant is a Blu-ray disc, then upon authentication, the consumer may presented with an option or the ability to playback the content of the disc.

In one example embodiment, a consumer may simply obtain the product at a merchant or retailer (e.g., without paying any money), and then, upon authentication of both the first and second authentication requests, be presented with one or more purchase options. For example, if the product is a Blu-ray or DVD disc, the purchase options may provide one or more tiers of playback rights, with each tier having an associated price. A first tier may enable playback of a trailer of the content (e.g., movie) stored on the disc for free; a second tier may enable playback of the content stored on the disc for a limited number of times (e.g., 3 times), limited time period (e.g., 5 days), or according to one or more other restrictions for a price of X; and a third tier may enable unlimited playback of the content stored on the disc for a price of Y>X. In this manner, the consumer can choose which tier to purchase, and may be allowed to purchase additional or different tiers at a subsequent time. If an additional tier is subsequently purchased, the consumer may be provided a discount based on one or more previously purchased tiers.

In another example embodiment, a consumer may purchase the product at a merchant or retailer. This initial purchase may entitle the consumer to certain benefits (e.g., limited access, such as limited playback). Then, upon authentication of both the first and second authentication requests, the consumer may be presented with additional benefits or the offer to purchase additional benefits. Returning to the illustration in which the product is a Blu-ray or DVD disc, the consumer may be presented with the option to purchase additional features (e.g., commentary, extended cuts, unlimited playback, etc.).

In embodiments in which the product is digital content (e.g., a Blu-ray or DVD movie), if a consumer purchases benefits upon or subsequent to authentication of both the first and second authentication requests, the benefits may be enabled by transmitting a key to a content player. For example, the content on a purchased or otherwise obtained medium may be encrypted. Upon authentication or purchase of benefits, node 100 may transmit or cause to be transmitted a key necessary to decrypt encrypted content on the medium.

While the point-of-sale device 102 and the user device 104 are depicted in FIG. 1 as being connected to the authentication node 100 via a connection to the Internet 106, it is to be understood that any type of networking medium and/or networking protocol may be used in the alternative (e.g., cellular networks, fiber-optic networks, cable networks, satellite networks, wireless networks, serial bus networks, etc.), and further, that the network connection between the point-of-sale device 102 and the authentication node 100 may be a different type of network connection than that between the user device 102 and the authentication node 100. Additionally, any type of network configuration or network topology may be used in accordance with the scope of various embodiments (e.g., personal area networks, metropolitan area networks, wide area networks, direct connection networks, star networks, ring topologies, etc.).

Additionally, the point-of-sale device 102 and user device 104 may consist of any type of electronic or computing device. For example, user device 104 may include, without limitation, a personal computer, a smart phone, a gaming console, a Blu-ray player, a streaming device capable of receiving movies, a personal data assistant, an e-reader, or a cable set-top box.

Figure 2:
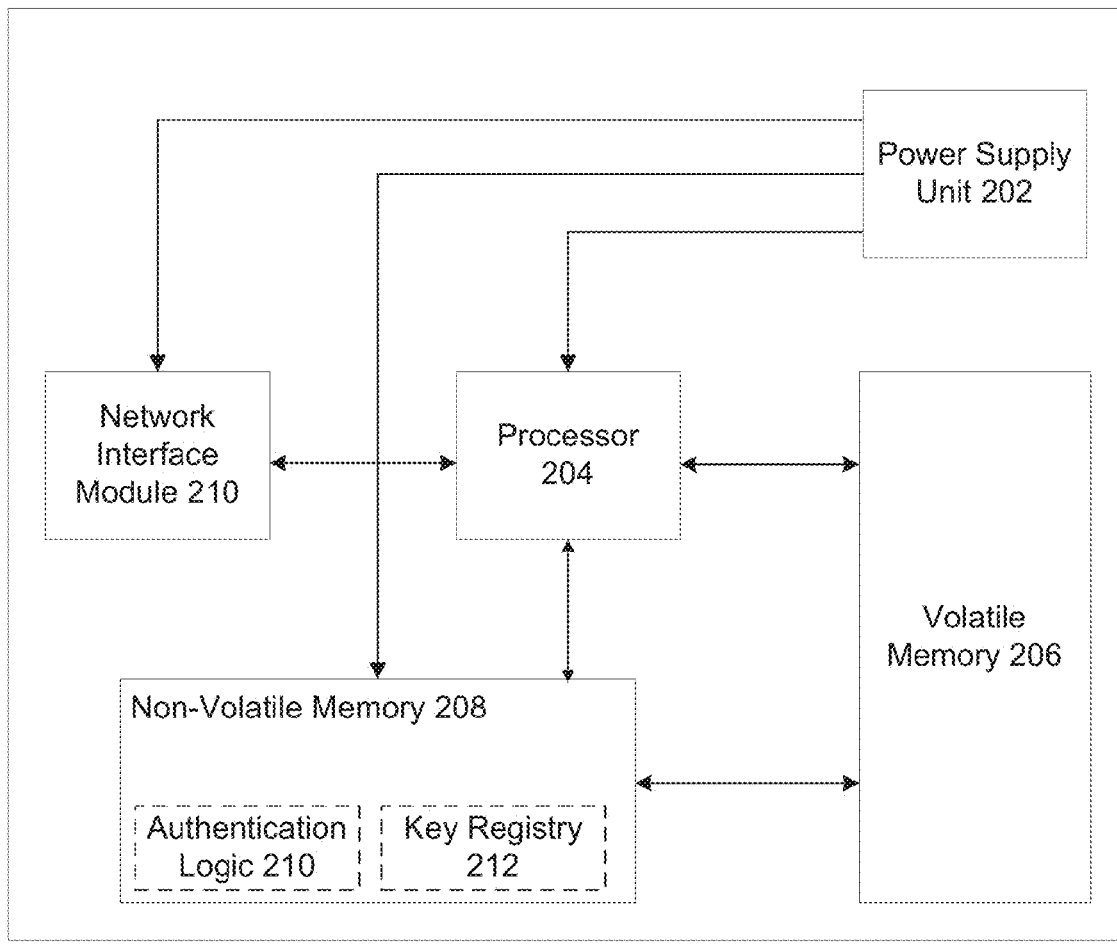
FIG. 2 illustrates an exemplary authentication node, according to an embodiment.

FIG. 2 is a block diagram of an exemplary authentication node 100 according to one embodiment. As illustrated by FIG. 2, authentication node 100 may include a power supply 202, one or more processors 204, volatile memory 206, non-volatile memory 208, and a network interface module 210. Non-volatile memory may further include authentication logic 210 and key registry 212.

A power supply unit 202 may provide a source of power to the various modules disposed within the authentication node 100. In some embodiments, power may be supplied externally by one or more conductive wires, for example, from a power cable or serial bus cable. In other embodiments, a battery may be used as a source of power.

One or more processors 204 are adapted to execute sequences of instructions by loading and storing data to memory. Possible instructions include, without limitation, instructions for data conversion, formatting operations, communication instructions, and/or storage and retrieval operations. Additionally, the one or more processors 204 may comprise any type of digital processing devices including, for example, reduced instruction set computer processors, general-purpose processors, microprocessors, digital signal processors, gate arrays, programmable logic devices, reconfigurable compute fabrics, array processors, and/or application-specific integrated circuits. The one or more processors 204 may also be contained on a single unitary integrated circuit die or distributed across multiple components.

Authentication node 100 may also comprise any combination of volatile 206 and non-volatile memory 208 adapted to enable digital information to be stored, retained, and subsequently retrieved. This includes RAM, DRAM, SRAM, ROM, and/or flash memory. These memory modules 206 and 208 may be organized in any number of architectural configurations utilizing, for example, registers, memory cashes, data buffers, main memory, mass storage and/or removable media. In some embodiments, the non-volatile memory 208 comprises authentication logic 210 and optionally, a key registry 212. Both of these modules may be used for unlocking access to media content secured over a network. During operation, pages of memory may be swapped out of non-volatile memory 208 and into volatile memory 206 in order to enable the one or more processors 204 to have quicker access to requested data.

The authentication logic 210 could be any combination of software, firmware, or hardware that enables authentication of constituent portions of a unique code identifier. The authentication logic 210 may include a mapping of a set of rules to each unique identifier, whereby successful authentication of each constituent portion of a unique code identifier triggers the set of rules. A means for generating unique codes and for associating such codes with a respective set of rules may also be included within the authentication logic 210, or may be provided within a separate module according to some embodiments.

Key registry 212 may be any data structure (e.g., database, file, array, list, queue, stack, tree, hash table, heap, etc.) that generates, associates, and stores constituent portions of each unique code. Alternatively, the constituent portions of the code or methods for deriving each code may be stored within separate data structures.

In some embodiments, the key registry 212 may be used to provide the constituent portions to a peripheral device for printing or otherwise affixing onto inserts. Duplex printing may then be used to simultaneously (or near-simultaneously) print a first code and its paired second code on opposite sides of the same substrate or material. Linking the codes together in this fashion advantageously mitigates errors caused by inadvertent insertion of mispaired codes within the same product casing.

In some embodiments, the key registry 212 itself may contain the listing of rights associated with each code in the registry 212. More than one right may be associated with each code. For example, a DVD bundle may be sold with rights to download all three movies in particular trilogy. Alternatively, a special edition video game may feature additional content bundled with the game to be downloaded, where a single code is used to unlock access to both the downloadable game as well as the additional content.

Authentication node 100 may also have one or more network interface modules 210 for interfacing over networks associated with the point-of-sale device 102 and the user device 104 (as seen in FIG. 1B). As stated above, any type of network may be used for these purposes, including, without limitation cellular networks, fiber-optic networks, cable networks, satellite networks, wireless networks, serial bus networks, etc.

A. Managing Access

Figure 3:
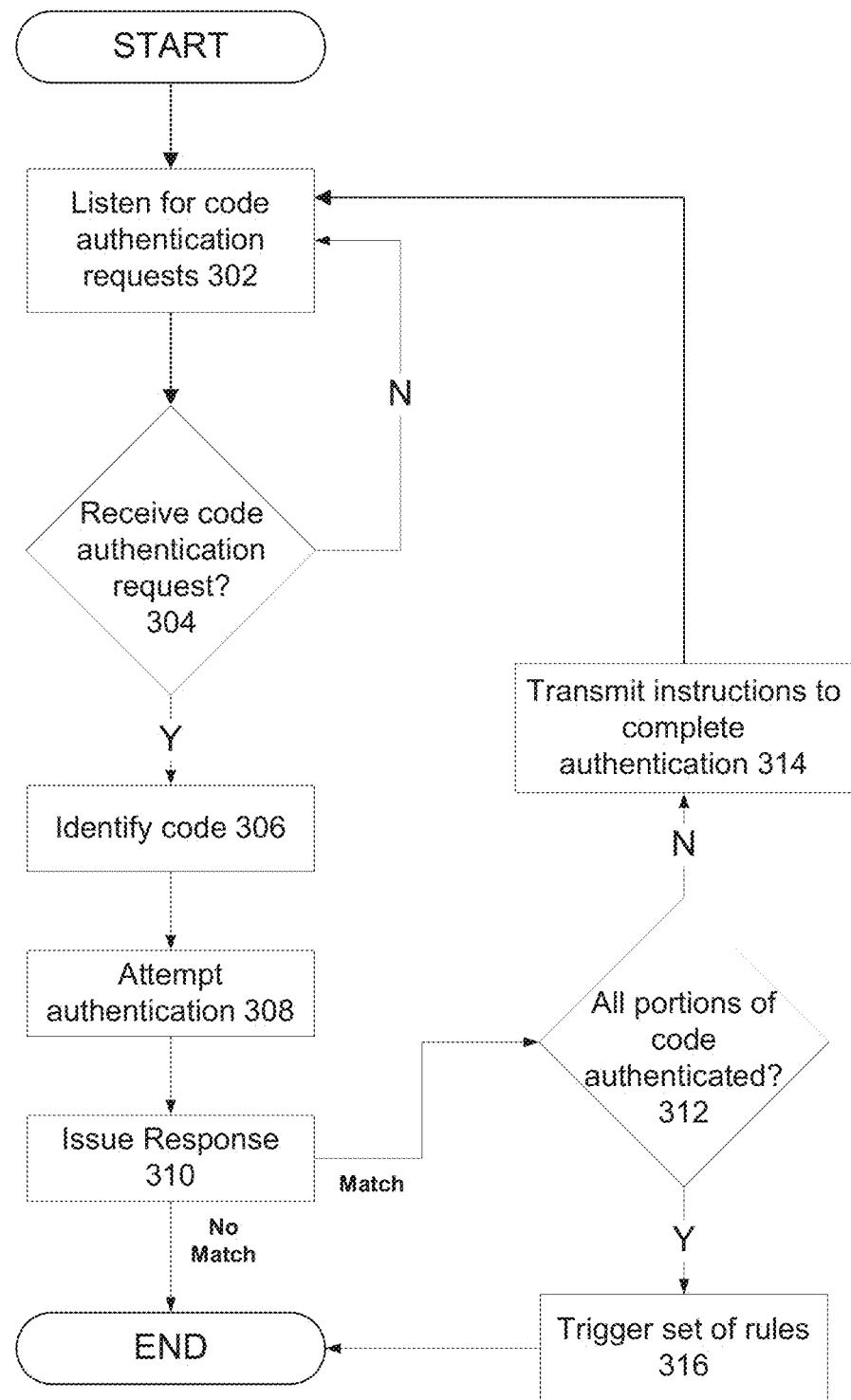
FIG. 3 illustrates a method of authentication, according to an embodiment.

FIG. 3 is a flow diagram of an exemplary method of authentication, according to an embodiment. In some embodiments, the depicted method may be performed, for example, by the server(s) or authentication node 100 depicted in FIG. 1A, FIG. 1B, and/or FIG. 2.

At block 302, the system may listen for code authentication requests submitted from either a point-of-sale device 102 or a user device 102. A transmission triggering an event or interrupt may be used for this purpose. In other embodiments, the authentication node 100 may periodically poll the point-of-sale device 102 and/or the user device 104.

If a code authentication request is received (for example, as shown in decision block 304), the constituent portion of the code may then be analyzed at block 306. In some embodiments, a flag or other indicator may be submitted with the code authentication requests indicating that this portion of the code is associated with either a point-of-sale device 102 or a user device 104 (or alternatively, that the enclosed code portion represents the first half or second half of the entire code sequence). An error message may be generated if the code portion cannot be properly identified.

Once the code portion has been successfully identified, then authentication of the code portion may be attempted at block 308. This process may involve comparing the transmitted code with a particular sequence contained within a key registry 212 (e.g., as shown in FIG. 2) or ensuring that the transmitted code is derivable from a particular sequence using known operations. If authentication is successful, a flag or variable may be updated so as to indicate that this respective portion of the unique code has been successfully validated.

A response may then be generated at block 310 indicating whether a match (i.e., identification of the constituent portion of the unique code) had been successful. In some embodiments, a network security module may be employed in order to limit the number of authentication attempts generated from a certain domain or IP address.

In some embodiments, rules associated with particular identifiers govern the authorization and fulfillment of the benefit/right conferred upon successful authentication. For example, in one embodiment, the rules may authorize access to the content when at least two conditions are met. First, when the key registry 212 receives a first unique identifier from an authorized first party (which is typically a vendor/retailer), and second, when the key registry receives a second unique identifier from a second party (which is typically a consumer) after the key registry 212 has been received from the first party.

Returning to FIG. 3, at block 312, a test may be performed in order to determine whether all portions of the unique code have been successfully authenticated. In embodiments containing two or more separate constituent portions of the code, this may involve checking a series of variables, a list, or an array for the purposes of determining whether all such portions have been successfully authenticated. A Boolean or other binary value may be set in the event that all portions of the code have been successfully authenticated.

If the each portion of the unique code has still not been authenticated, then at block 314, a set of instructions may be transmitted to the device issuing the code authentication request. The authentication node 100 may then resume listening for code authentication requests at block 302.

Conversely, if each portion of the unique code has been successfully authenticated, the corresponding set of rules may then be triggered at block 316. In one embodiment, this may involve transmitting an unlock sequence or key to the user device 104. The user may then input this sequence or key into a program interface in order to access the requested media. In other embodiments, a file may be uploaded to the user device 104 which overwrites or adds an additional file to the user device 104, the presence of which enables access to the requested media. In still other embodiments, authentication node 100 may initiate a transfer of the requested content from one of its own memory modules, or otherwise provide a special instruction to a remote content server (not shown) for initiating a transfer of the requested content to the user device 104. The process then ends.

Disc Case Examples

FIGS. 4A-7B depict various embodiments of a product package bearing a first identifier 410 and a second identifier 420 which may together serve to enable or trigger a set of rules conferring one or more benefits upon a consumer. The identifiers 410 and 420 may be presented on a substrate such as an insert, sleeve, cover, casing, article, or packaging having the first identifier 410 on one side and the second identifier 420 on the opposite side. This substrate may be part of the container housing the product itself, such as an optical disc case (e.g., DVD case, Blu-Ray case), product box, cereal box, bag of chips, or television box. Alternatively, the substrate may be inserted or attached to a separate product casing, such as a label, sleeve, jacket, or cover of a CD, DVD, or Blu-Ray disc that is inserted into a case. Alternatively, the identifiers 410 and 420 may be printed or affixed directly upon the product (such as upon a surface material such a metal, plastic, cardboard, or glass) with appropriate positioning in lieu of a dedicated insert. Either or both of these identifiers 410 and 420 may include a bar code, a QR code, an alphanumeric string, a uniquely identifiable image, or some combination thereof. As will be explored in further detail with reference to FIGS. 4A-7B, in some embodiments, the substrate or material may be positioned such that a first side is outwardly facing and can be optically read by a human or machine, while the second side is inwardly facing so that it cannot be optically read by a human or machine until the product or its packaging has been opened.

In some embodiments, the product insert or packaging may be enclosed or sealed in such a way (e.g., destructible shrink-wrap, seal, tape, label, etc.) so as to enable a first party (e.g., a retailer) or a second party (e.g., a consumer) to readily ascertain that the product or its packaging has been opened and the codes compromised. For example, a substrate attached to, inserted in, or integrated with a product container or upon the product surface may bear the second identifier on a surface that would not be visible while the package is closed. If the substrate is a peel-away label, for example, the label may be selected such that any attempt at replacing it after peeling it away would be noticeable by a consumer. Alternatively, the product casing may have a removable pin or other one-way mechanism which enables access to the second identifier, but which cannot be replaced once removed. A deformable button or pop-out material may also serve as evidence that a product has been tampered with, where such mechanisms do not restore to their factory default state after being actuated. Such mechanisms enable the product to be tamper-evident such that compromised products can be immediately identified, minimizing the risk that they will be purchased by unwitting consumers.

In some embodiments, a product or the product's packaging may allow the second identifier 420 to be read by a consumer once the product or package is opened. For example, the product or its packaging may have cut-outs that allow the second identifier 420 to be seen through them. Alternatively, the product or its packaging may be made of a transparent or partially transparent material that allows the second identifier 420 to be viewed through the transparent material. Optionally, this material may be treated or modified to reduce glare that might otherwise impede a reader's ability to read the second identifier when formatted as machine readable code (e.g., a bar code or a QR code). In still another example, the product or its packaging may be unfolded or opened in such a way so as to reveal the second identifier 420. Such examples will be explored in further detail below with reference to FIGS. 4A-7B.

Figure 4A:
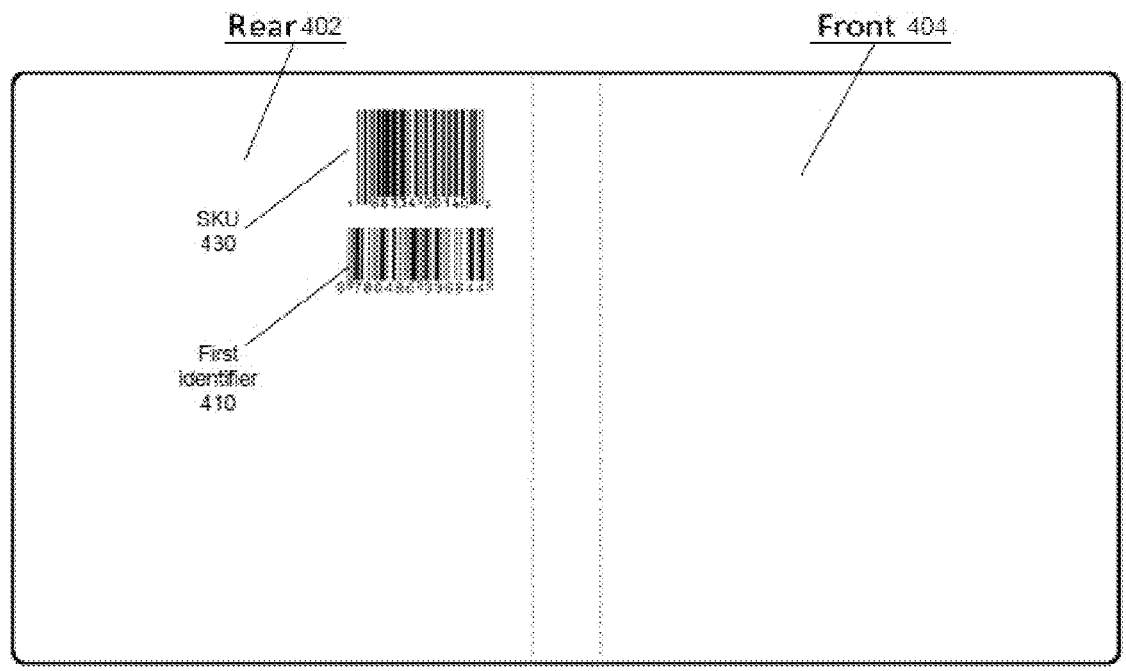
FIG. 4A illustrates the rear and front of an example insert bearing a visible first unique identifier and a hidden second unique identifier, according to an embodiment.
Figure 4B:
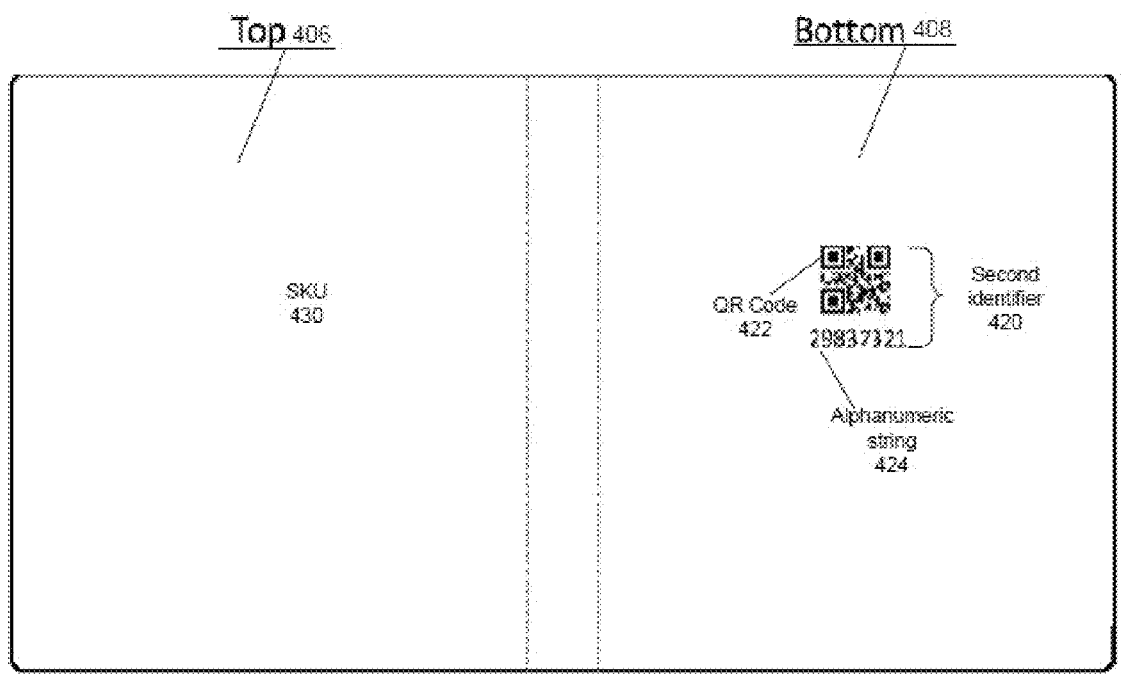
FIG. 4B illustrates the top and bottom of the insert depicted in FIG. 4A, according to an embodiment.

FIG. 4A is a screen capture of the rear 402 and front 404 of an exemplary insert bearing a visible first identifier 410 and a second identifier 420 (as shown in FIG. 4B), according to an embodiment. As shown in the figure, the first identifier 410 may be oriented such that it is visible to the line-of-sight of a reading device such as a bar code scanner. Optionally, an additional code such as an SKU code 430 may also be disposed anywhere upon the visible side of the insert as shown in FIG. 4A.

The SKU code 430 is typically associated to a group of similar products. In some embodiments, the first identifier may be associated with the SKU code 430 and used in the authorization process. A requested benefit/right may be associated to the SKU 430 associated with a movie title, which in turn is associated with a population of first identifiers (the DVDs making up the population defined by the SKU 430).

FIG. 4B is a screen capture of the top 406 and bottom 408 of the exemplary insert depicted in FIG. 4A. The second identifier 420 may comprise any combination of machine and/or human-readable identifiers. For example, as depicted in FIG. 4B, the second identifier 420 includes QR code 422 and alphanumeric string 424. In some embodiments, the insert may be adapted to fold along the dashed lines (e.g., wrapped around a plastic container) in order to conceal the second identifier 420. Optionally, shrink-wrap or a plastic transparent casing may be placed around the container in order to further prevent unauthorized access to the second identifier 420.

Figure 5A:
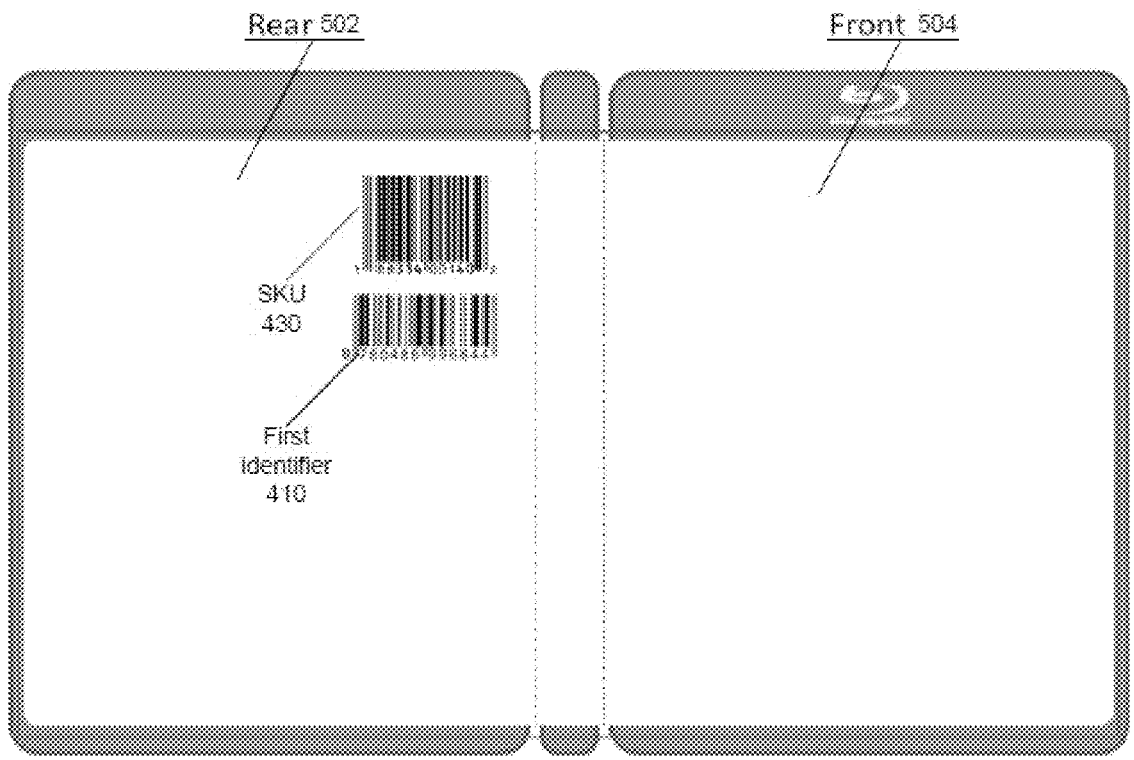
FIG. 5A illustrates the rear and front of an example Blu-ray case bearing a visible first unique identifier and a hidden second unique identifier, according to an embodiment.
Figure 5B:
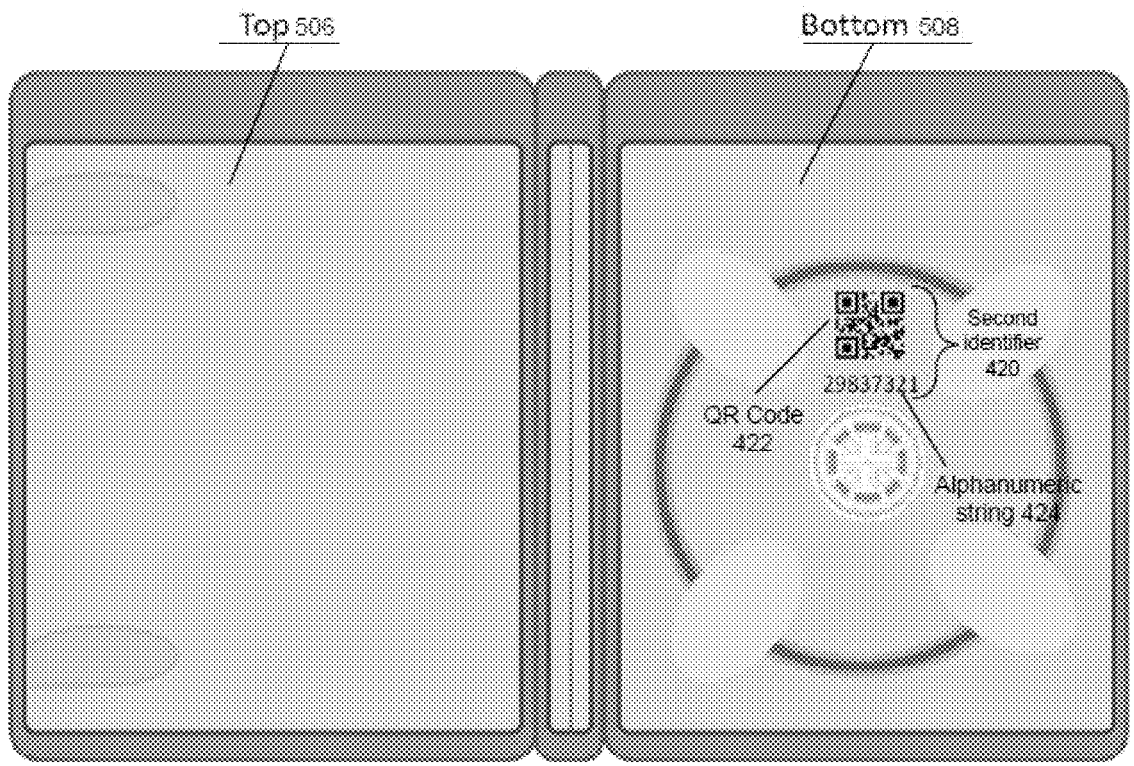
FIG. 5B illustrates the top and bottom of the Blu-ray case depicted in FIG. 5A, according to an embodiment.

FIG. 5A is a screen capture of the rear 502 and front 504 of an exemplary Blu-ray case bearing a visible first identifier 410 and a second identifier 420 (as shown in FIG. 5B), according to an embodiment. As in the case of FIG. 4A, in an embodiment, the exterior surface may optionally include an SKU code 430 or other identifier in conjunction with the first identifier 410.

FIG. 5B is a screen capture of the top 506 and bottom 508 of the exemplary Blu-ray case depicted in FIG. 5A, according to an embodiment. As depicted in this example, the insert bearing the second identifier 420 including the QR code 422 and the alphanumeric string 424 may be visible behind a transparent or partially transparent layer disposed within the Blu-ray case. Alternatively, the second identifier 420 may be disposed upon a portion of the Blu-ray casing material itself. Also, according to some embodiments, the second identifier 420 may be positioned such that it will be shielded from view by a Blu-ray disc snapped into the disc tray.

Figure 6A:
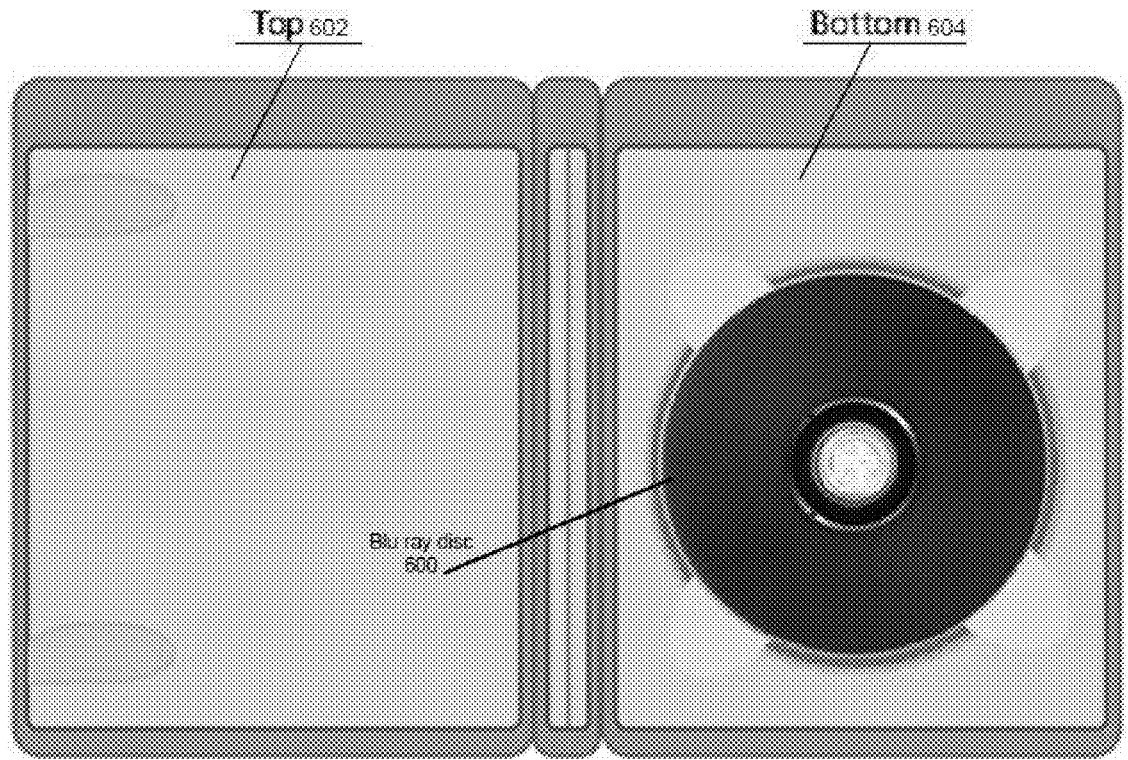
FIG. 6A illustrates the top and bottom of an example Blu-ray case containing an insert with a second unique identifier hidden by a Blu-ray disc, according to an embodiment.
Figure 6B:
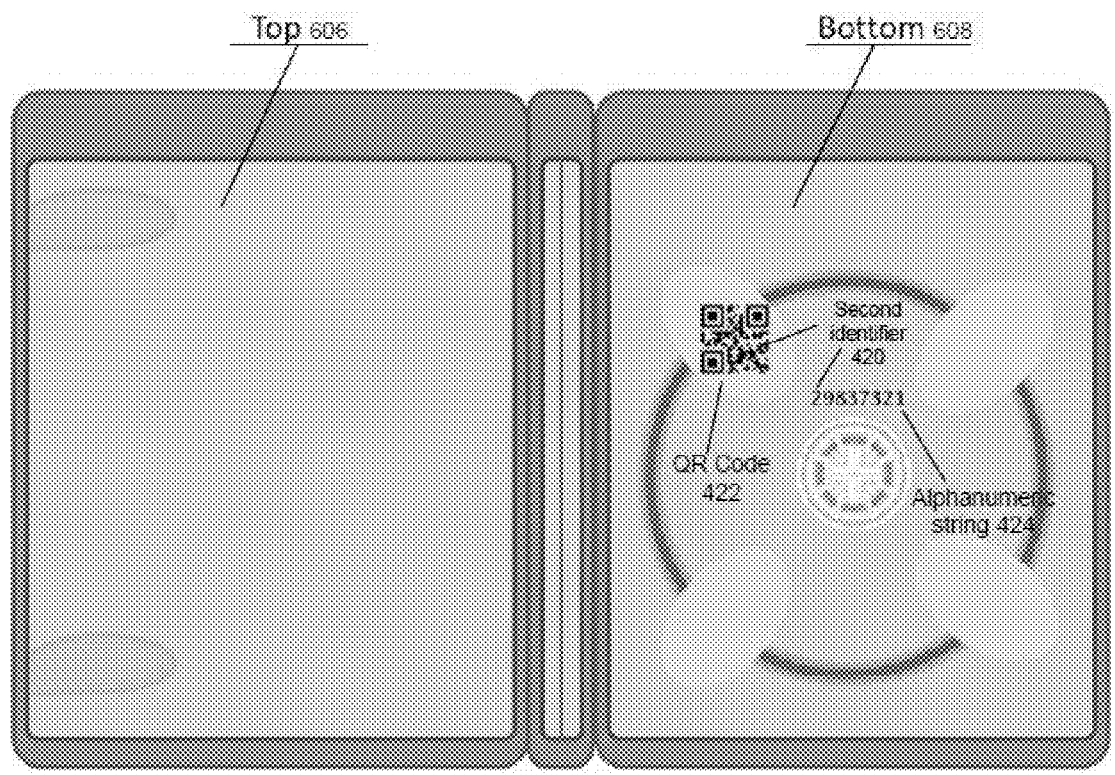
FIG. 6B illustrates the top and bottom of an example Blu-ray case showing the second unique identifier exposed when the Blu-ray disc is removed in accordance with the embodiment depicted in FIG. 6A, according to an embodiment.

For example, FIG. 6A is a screen capture of the top 602 and bottom 604 of an exemplary Blu-ray case containing an insert with a second identifier hidden by a Blu-ray disc, according to an embodiment. FIG. 6B is a screen capture of the top 606 and bottom 608 of the exemplary Blu-ray case depicted in FIG. 6A, showing the second identifier 420 exposed when the Blu-ray disc is removed. While the Blu-ray disc 600 itself is depicted as shielding the second identifier from view, different types of elements may be used to shield the second identifier in alternative embodiments. These elements may include, without limitation, removable tabs, stickers, scratch off material, sliders, switch panels, and other similar mechanisms. Such mechanisms may serve as a further impediment to unauthorized access of the restricted content.

As shown in FIG. 6B, according to some embodiments, all or a portion of the second identifier 420 may be disposed within a recess (e.g., used for lifting a disc) for greater transparency and improved readability. This may increase the reliability of the reads taken by automated readers such as scanners or photographic devices. A human-readable code may be positioned in a separate disc recess or behind the transparency such as the alphanumeric string 424 depicted in FIG. 6B.

Figure 7A:
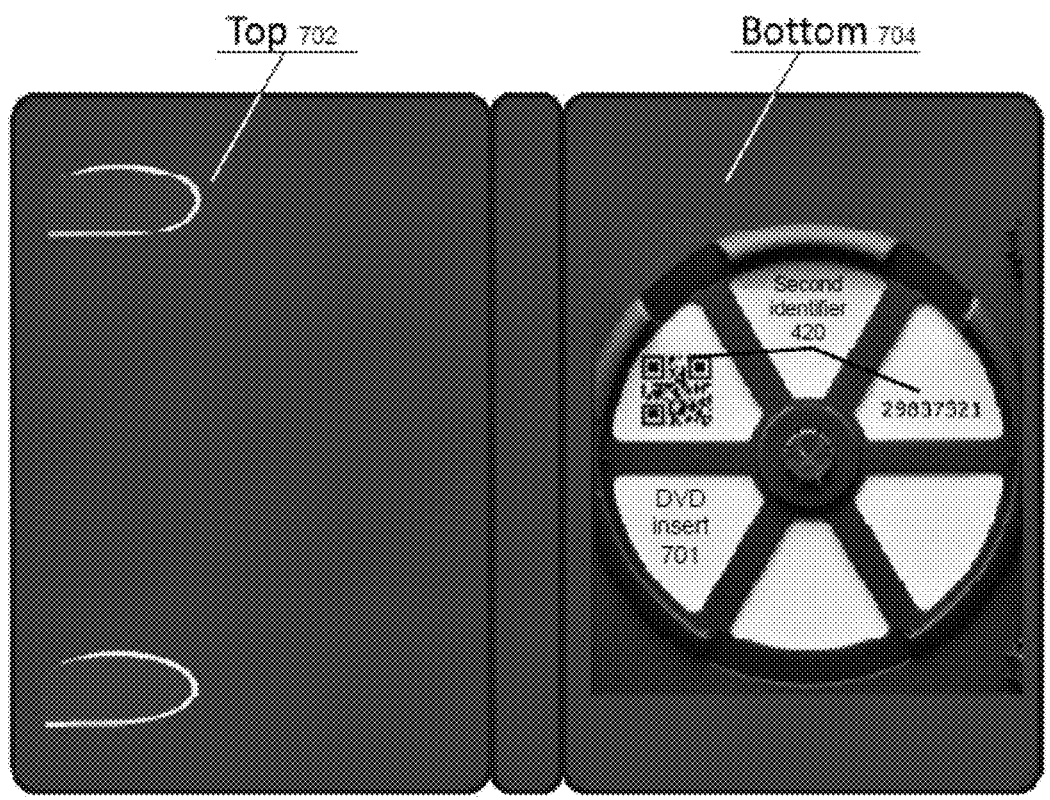
FIG. 7A illustrates the top and bottom of an example DVD case containing an insert with a second unique identifier visible through cut-outs in the case, according to an embodiment.
Figure 7B:
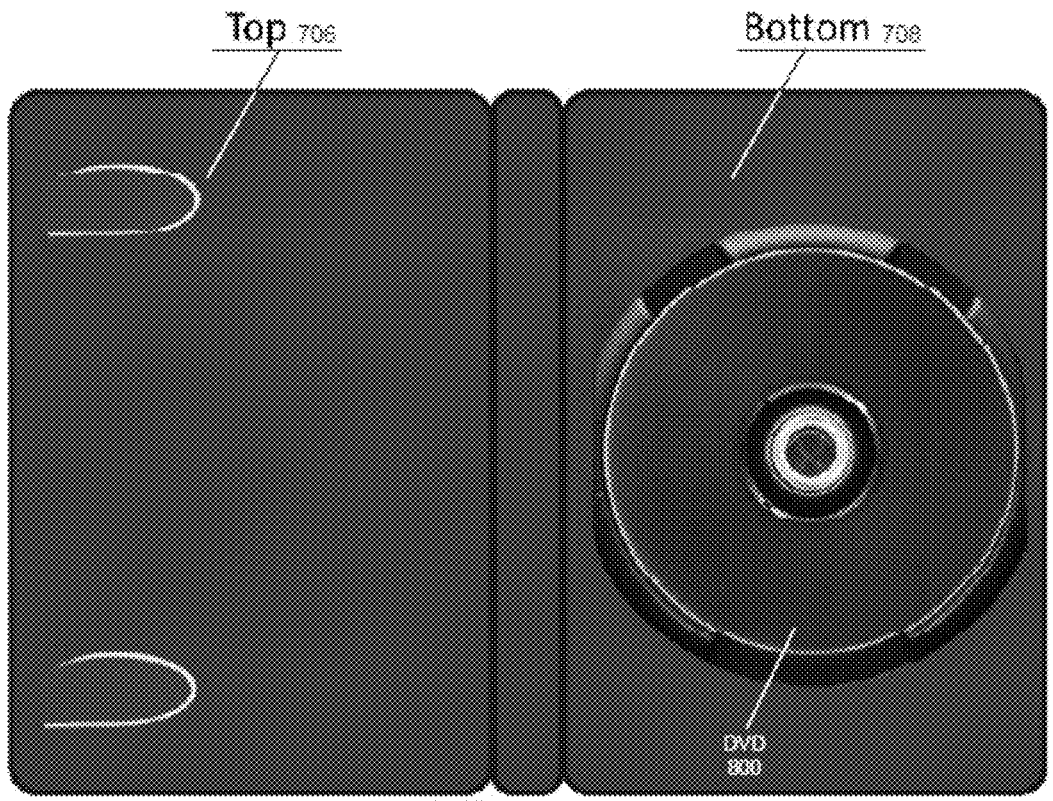
FIG. 7B illustrates the top and bottom of the example DVD case where the second unique identifier is hidden by a DVD in accordance with the embodiment depicted in FIG. 7A, according to an embodiment.

FIG. 7A is a screen capture of the top 702 and bottom 704 of an exemplary digital video disc (DVD) case containing an insert with a second identifier visible through cut-outs in the case, according to an embodiment. FIG. 7B is a screen capture of the top 706 and bottom 708 of the exemplary DVD case depicted in FIG. 7A where the second identifier is hidden by a DVD 800. As shown in FIG. 7A, the form of the DVD case may include one or more apertures or cut-outs enabling the second identifier 420 to be visible when the disc is removed. As shown in FIG. 7B, the DVD 800 may serve to block the second identifier 420 when it is snapped into its DVD tray.

According to some embodiments, the first code and the second code may be printed on the same side of the insert. In such cases, the insert may be folded or closed in such a way that the unique code is not externally readable until it is unfolded or opened. To prevent a casual criminal from defeating the system, a means of showing that the product or its package has been prematurely opened can be incorporated into such embodiments.

To further impede criminals from opening products prior to the sale and theft of access codes, it may be advantageous for the second identifier to be covered with an opaque material (e.g., latex) that can be scratched off by the consumer after the item has been purchased. In some embodiments, the second identifier may also be physically accessible (e.g., via the cut-out) to the consumer of the restricted content.

According to some embodiments, neither a first party (e.g., a retailer) nor a first unique code is necessary for accessing the content. For example, consider a DVD without the first identifier including external shrink-wrap and/or spine labels (tape). In such a configuration, the right to access secure media content is authorized when the key registry receives the code previously associated with the second identifier. This particular code remains protected from misuse/theft until the product is sold since open packaging (tampered shrink-wrap, spine labels, etc.) would discourage retailers from selling (or consumers from buying) a product that had been tampered with.

In some embodiments, additional code identifiers may be used to unlock protected media content. For example, instead of relying on only a paired set of codes, a third, fourth, or nth code may be used in the alternative. This may be used, for example, to track an item of merchandise across multiple levels of a supply chain.

In some embodiments, multiple codes from separate items may be required before content is unlocked. Loyalty or frequent buyer programs, for example, may require a set number of separate purchases before access to designated content is granted. Content may also be unlocked when multiple actors are involved in a group activity (e.g., multiparty experiences or multiplayer games).

B. Control Rights

There are well-known ongoing challenges in content businesses to secure their content from theft and to prevent its unauthorized use. This is a continuous battle of cat and mouse between the manufacturers and those seeking unauthorized access. There have been many solutions proposed to these problems. While many mitigate this issue, none eliminates the problem and the resulting lost revenue for the content owner.

Also, retailers of digital content are subject to high rates of theft. This lowers the effective profitability of the product category for the retailer, prompting some retailers to eliminate selling the product category because of this low level of profitability. In addition, the rental of digital content is associated with a number of problems. The quality of content that is electronically distributed is limited by the available bandwidth to the consumer. Existing rental solutions for physical media exist, but they have costs associated with inventory control and management or, in the case of physical mail rental models, returns.

What is needed is a system that will control the access to digital content distributed on optical media, and its associated rights, and ensure that only content that has been purchased at authorized retailers is accessible.

In an embodiment, an existing mechanism for digital rights management (DRM) is linked with retail transactions (e.g., sales) to ensure that an access key is distributed only when an authorized retail transaction has taken place (e.g., the disc has been sold at an authorized retailer).

In disc manufacturing there are known approaches for serializing discs. In a standard approach, the Burst Cutting Area (BCA) or narrow BCA (NBCA) refers to the circular area near the center of a CD, DVD, HD-DVD or Blu-ray disc, where a code similar in appearance to a printed barcode can be written for additional information such as ID codes, manufacturing information, and serial numbers. The BCA can be written during mastering and may be common for all discs from that master or, more usually, will be written using a YAG laser to "cut" the BCA into the aluminum reflective layer of the finished disc, potentially adding a unique barcode to each manufactured disc.

The data stored in the BCA can generally be from 12 bytes to 188 bytes in steps of 16 bytes. The BCA can be read using the same laser for reading regular data, but may require special circuitry to be decoded. The BCA generally cannot be written without using special equipment. Therefore, it can be used as a tamper-proof means of identifying individual discs. The DIVX format used BCA to uniquely identify every disc. Information for CPRM is stored in the BCA of a DVD-RAM or DVD-R/RW disc. Nintendo™ optical discs use a BCA mark to prevent the use of copied discs and homebrew games. On Blu-ray Discs a Pre-recorded Media Serial Number (PMSN) can be stored in the BCA.

Another form of disc serialization is provided by Postscribed IDTM. This technology enables the additional inscription of a unique ID onto a CD/DVD's signal surface after the stamping process at the disc plant. By using a high-power laser diode, a new reflective layer material, and extremely accurate location-control technology, Postscribed IDTM can enable content publishers to identify each disc of an individual title with a code that can be read by disc players.

There have been many approaches used to protect digital content stored on optical discs. For example, in the Blu-ray system the ROM Mark or BD-ROM Mark is a serialization technology designed to guard against mass production piracy or the mass duplication and sale of unauthorized copies of pre-recorded Blu-ray Discs. Whereas, in this context, a PMSN may be a logical volume serial number for a disc, the ROM mark is the physical instantiation of the logical volume serial number. Only licensed BD-ROM manufacturers have access to the equipment that can make these unique ROM Marks, thus allowing authentic BD-ROM media, such as movies and music to be identified. The ROM Mark contains the Volume ID required to decrypt content encrypted using AACS, a content encryption scheme.

In embodiments, a unique disc serial number (DSN) and a unique disc encryption key (DEK) may be used. The DSN can be the PMSN described above or be a unique number generated as an extension of other product identification methods such as the standard Global Trade Identification Number (GTIN). The GTIN is a standard that provides a hierarchical structure for uniquely identifying trade products and their manufacturers. Such identifiers are used to look up product information in a database (often by inputting the number through a bar code scanner pointed at an actual product), which may belong to a retailer, manufacturer, collector, researcher, or other entity. The GTIN family of codes can be used uniquely to identify an item as having been manufactured by a particular company, the item's membership in a product class, or its membership in a particular product category. In addition, the code can be used to identify a specific item. If the GTIN is used, the resulting DSN can be constructed as a combination of the GTIN code and a unique item-level serial number. Using the GTIN provides a number of benefits in supply chain management. By associating DSNs with particular product categories, a network operating center (NOC) (e.g., server(s) or authentication node 100) can ensure that the DSN entered is appropriate for the PSN. The GTIN can also be used to reduce the length of the PSN that the purchaser would need to specify to the NCP.

In an exemplary implementation, a unique item-level, product serial number (PSN) formatted as an optical code (e.g. alphanumeric, barcode, or QR code) is placed on the outside of the product packaging. In addition, the DEKs for all DSNs, along with their associated DSNs, are transmitted to a NOC. There is no requirement for the PSN to be transmitted by the content owner to the NOC.

It should be noted that in some disc protection schemes multiple keys are used to protect the content of the disc (e.g., one key per title, region, portion, chapter, episode, etc.). Thus, the DEK may be only one of the keys (e.g., a title key) or may comprise a subset of the keys that are required (e.g., including all of the required keys for the purchased music titles and/or video episodes). In other words, the DEK may actually be a set of one or more keys that are required to access and decrypt content. There may be more than one DEK because different content may be encrypted using different DEKs or there are multiple DEKs required to access the same content. In either case, any necessary keys (e.g., DEKs) can be provided to the NOC by the manufacturer. In an embodiment, it is sufficient that the DEK be required at some point in the access process.

At the point-of-sale, the PSN may be read by the retailer and transmitted to the NOC. At the NOC, the PSN is then marked, flagged, stored, or otherwise persistently indicated as having been authorized. After purchase, the disc can be inserted in an appropriately configured network-connected player (NCP) (e.g., user system(s) or user device 104). NCPs have an Internet connection to the NOC.

In one implementation, if this is the first time that the NCP has received or seen the DSN (e.g., read the DSN from the disc), the NCP prompts the consumer for the PSN. The consumer then enters the PSN from the packaging. In another implementation, the PSN is scanned by a camera or other optical reader coupled to the playback device. This implementation eliminates the requirement for the consumer to manually enter a code. In either case, the NCP transmits both the PSN and DSN to the NOC.

At the NOC the status of the PSN is checked. If it has been received previously from an authorized retailer, the DEK (or two or more DEKs) for that specific disc is returned to the NCP. Using the DEK(s), the NCP can decrypt and play the content. If the PSN has not been scanned and transmitted by an authorized retailer, according to rules specified by the content owner, the server could return a message to the NCP that the disc has not been authorized. In this case, the DEK would not be returned and the content would remain inaccessible.

The rules specified by the content owner can be wide-ranging. For example, the rules may include control over temporal access windows for the content (e.g. one or 24 hour sessions, not before a day, date, time, event, etc.). In addition, the content owner may want to restrict access of the content to previously registered NCPs. Prior to this interaction, there is no requirement for the PSN to have been associated with a DSN. During this interaction, at the NOC the PSN is uniquely associated with this DSN. If the PSN is subsequently received by the NOC with another DSN, the NOC will detect this and may reject the request or take some other action, according to rules specified by the content owner.

Once the disc has been authorized, the NCP may store the associated PSN and DSN, and bypass the requirement for the purchaser to enter the DSN on subsequent uses. Access by the NCP would be automatic—subject to the rules specified by the content owner at the NOC. Depending on the implementation, this subsequent access could be controlled by communication between the NCP and the NOC, or the processing rules could have been communicated by the NOC when the DEK was first returned by the NOC.

An additional use of embodiments disclosed herein is in the management of conditional access rights (e.g., rental or purchase). In this case, the rules associated with the DSN and PSN could specify that the content could be accessed for one or more limited periods of time or one or more accesses. The NCP would then allow access consistent with the content owner specified rules.

A further use would be to control access to multiple types of content on a disc. In this example, there may be multiple content types that are encrypted with different DEKs on the disc. The rights that are associated with the PSN could be used to control which DEK is provided to the NCP. A consumer's rights could then be further extended and modified at a later time through additional rights purchases made by the holder of the PSN. For example, these rights could be extended simply by making additional purchases that are associated with the PSN. At the time that a request for a DEK is made, the NOC can decide which key to return based upon the existence of these additional rights. These additional rights may include additional access (e.g. "rentals", the application of previous rentals to the purchase of unrestricted access of the content, purchase of unrestricted access to the content, access to additional content stored on the disc).

In an embodiment, a hybrid disc, formatted as a DVD on one side and an Blu-ray disc, on the other could contain the same DSN or uniquely paired DSNs, with one authorized at the retail point-of-sale (e.g., the lower quality DVD side) and the other side (e.g., the higher quality Blu-ray side) authorized after the consumer has purchased (and potentially viewed) the DVD side.

In the event that the content on the disc is not encrypted in a manner that makes use of the DSN, disclosed embodiments may still allow for limiting the access to content. The DEK returned to the NCP can be encrypted using a database of encryption keys that are specific to NCPs. With this approach, the returned encrypted DEK would be useful for access to content only by that NCP. This would allow for taking advantage of existing schemes for DRM that invalidate NCPs which have been determined to have been compromised.

To further minimize the risks associated with the theft of content and authorized PSNs, the described model can be supplemented with the use of paired packaging codes. Because of the nature of the production process, it can be difficult for manufacturers to synchronize the specific PSNs with specific discs. Given this problem, to facilitate this pairing, the process described above can be extended to include the use of interior packaging codes that are paired with the PSN either directly or through an algorithm. This internal code can be used to validate that the PSN used is the PSN associated with this particular package and was not obtained independently without purchasing the product (e.g., scanning the code on the package in the store).

Embodiments can also be used for the automatic registration of rights to an account. If a device has been registered previously to an account, as in the DRM process used by UltraViolet, any rights associated with this disc can be automatically associated with the account with which the NCP has been associated. In an exemplary implementation, the NCP can prompt the consumer to indicate whether this NCP is associated with an account to which rights associated with the disc should be registered. If it is (e.g., as indicated by the consumer's response to the prompt), the rights can be automatically registered.

In an embodiment, the content owner is provided with control over access to the content and the ability to limit unauthorized access. In addition, retailers can be benefited by selling a product that will be less appealing to thieves, and therefore generate a lower level of losses and higher profitability.

Figure 8:
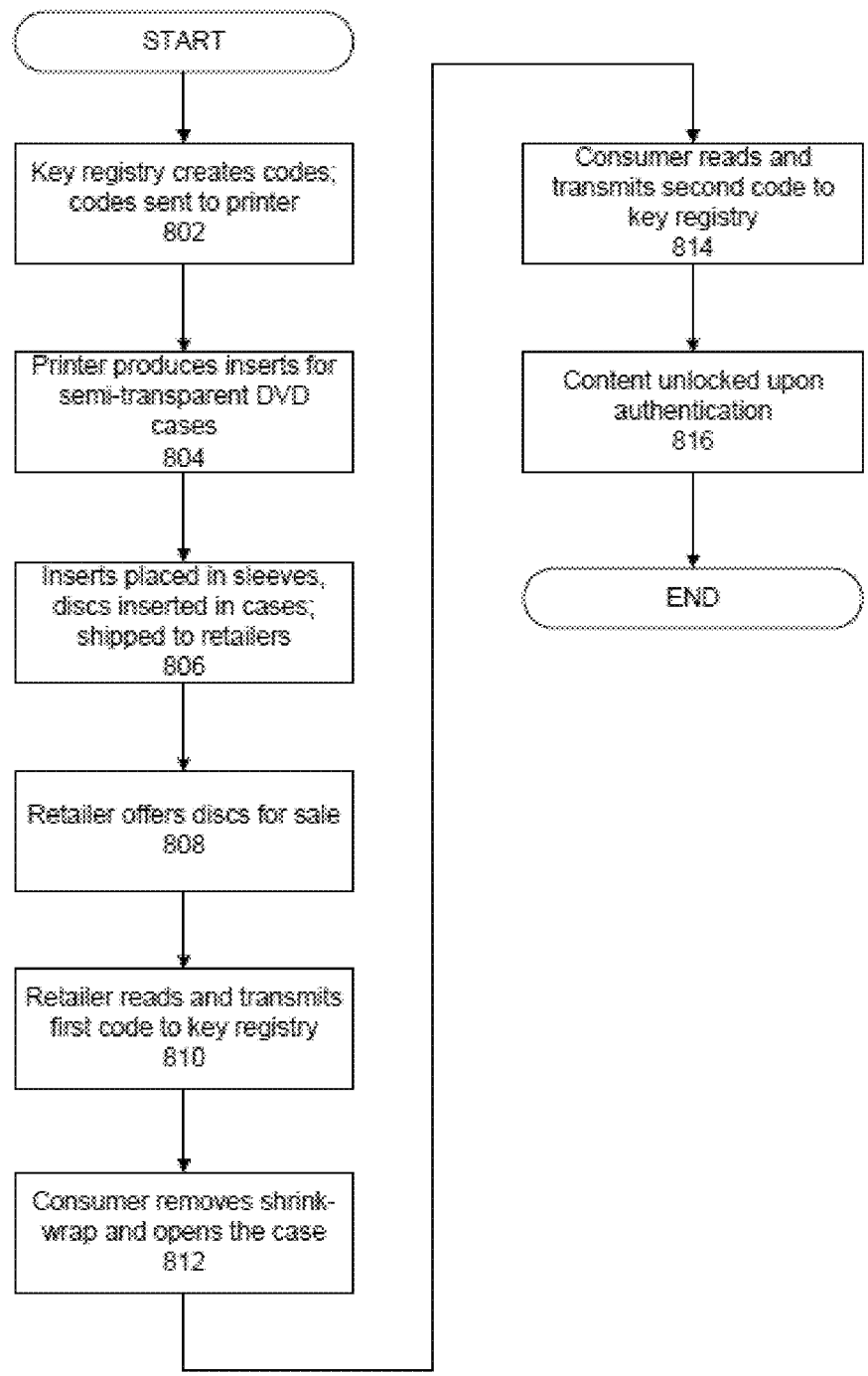
FIG. 8 illustrates a high-level method of utilizing a system of controlling access to secure media content, according to an embodiment.

FIG. 8 is a flow diagram illustrating a high-level method of utilizing a system of controlling access to secure media content, according to an embodiment. At block 802, the key registry generates, stores, and sends to an insert printer a series of paired identifiers. Alternatively, the key registry provides an algorithm or algorithms for generating the series of paired identifiers. For example, a cryptographic function with appropriate seeds can be provided to generate multiple linked and authenticable codes.

Rights and rules associated with each code in the key registry may also be generated.

At block 804, an insert printer produces inserts for DVD cases, such that the first and second codes are printed on opposite sides of each insert in such a way that the second code will be revealed only when the case has been opened. As mentioned above, the DVD case may include a transparent or semi-transparent layer positioned over the back side of the insert such that the second identifier is visible through the transparent or semi-transparent layer.

At block 806, the DVD manufacturer places the inserts into clear plastic sleeves common to the outside of DVD cases. The discs are then inserted into cases; the cases are then closed and subsequently shipped to authorized retailers. At block 808, the various retailers then offer these cases for sale.

When one of the DVDs is sold, at block 810, the retailer reads and transmits the first code to the key registry. An attempt to authenticate the code is then performed at the authentication node. Optionally, a confirmation message may be presented to the retailer indicating successful or unsuccessful authentication of the first code.

At block 812, the consumer that bought the disc removes the shrink-wrap and opens the case revealing the second code through the semi-transparent plastic of the case. The consumer then reads and transmits this second code to the key registry at block 814.

Upon successful authentication of the second code, at block 816, the content is unlocked. The consumer may then be given access to the media content and the process then ends.

Note that while the previous figures (including FIG. 8) depict access to content being granted in a particular combination (the first code is authenticated, followed by the second code), in other embodiments, other combinations are also possible (e.g., the second code followed by the first code). In some embodiments, no particular combination of code authorizations is necessary for unlocking requested content.

As stated above, it some embodiments, in order to avoid mismatching first codes and second codes, a printing solution may be employed where the first code and the second code are printed upon the same article (e.g., duplex printing) and/or printed at approximately the same time. In other embodiments, however, the first code and the second code may be printed in two distinct operations. In such applications, the first printed code may be read immediately prior to the printing of the second code in order to ensure that the two codes are properly matched. Likewise, in embodiments where codes are printed on two separate articles, the first and second codes may be associated at the time one or more of the articles are applied to an item or its packaging.

Three-Code Examples

In some embodiments, a single item may include a first code and a second code on one article (e.g. a bottle cap or peel-back label), and a third code on a separate article (e.g. a sticker or label) affixed to the item.

As depicted in FIGS. 9A, 9B, and 10, in some embodiments, a first code 910 and a second code 920 may be incorporated into a bottle cap 900 (for example, as commonly used for soda or water) in several ways.

For example, FIG. 9A is a block diagram illustrating the top of an exemplary bottle cap 900 bearing a first 910 according to one embodiment. FIG. 9B is a block diagram illustrating the underside of bottle cap 900 bearing a second code 920. As illustrated by this figure, the first code 910 and the second code 920 may be printed on an article (e.g., a seal) inserted inside, for example, a transparent bottle cap 900, where the first code 910 can be viewed externally through the bottle cap, and the second code 920 can be viewed only when the bottle cap is removed from the bottle. In cases where size of the article is a limitation, the first code may be of a type that is not readable at the point-of-sale by conventional code readers. Therefore, an externally facing third code may be printed on a separate label that is affixed to the item.

For example, FIG. 10 is a block diagram illustrating a soda bottle 1000 containing a label 1002 bearing an exemplary third code 1030 according to one embodiment. The third code 1030 may be a machine-readable code that is printed or affixed to the label 1002 as illustrated by the figure. In some embodiments, immediately prior to the final packaging step, the first codes 910 affixed to the individual items (e.g. individual soda bottles 1000) are optically read or scanned and associated with the third code 1030 printed on the label 1002.

The cap 900 may be made from a transparent or semi-transparent material with sufficient clarity such that a first code 910 can be viewed through the top of the cap 900. The first 910 and second 920 associated codes may be duplex printed on a seal which is inserted into the cap so that the first code 910 is visible when the cap 900 is on the bottle 1000 (see FIG. 10), and the second code 920 is on the inside of the cap 900, and only visible when the cap 900 has been removed. In this case, the cap 900 may be manufactured without molding artifacts that might interfere with a clear view of the code through the cap material. In some embodiments, where semi-transparent material for the cap 900 is used, the seal surface with the first code 900 must be in close contact with the cap material to permit sufficient contrast and resolution for reading the code through the material. In some embodiments, the first code 900 may be printed on the outer top surface of a semi-transparent or opaque cap and the associated second code 920 is printed on the inside of the bottle cap. Similarly, the first code 910 will be externally visible, while the second code 920 is only visible when the cap is removed.

In some embodiments, the seal may be affixed to the rim of the bottle 1000 rather than inside the cap 900. The first codes 910 and second codes 920 may be duplex printed on opposite sides of the seal prior to applying the seal to the bottle. In some embodiments, the cap may be sufficiently transparent to allow reading the first code 910 through the cap 1000. The second code 920 becomes available and readable only after the cap 1000 and seal are removed by the consumer. Alternatively, the first code 910 may be printed on the external surface of the cap 900 and the associated second code 920 may be printed on the top surface of the seal, where the cap material is sufficiently opaque to prevent reading the second code 920 through the cap 900. The first code 910 may be visible and readable at the point of sale, while the second code 920 is accessible and readable only after the consumer has removed the cap.

Bottle caps 900 typically have a tamper-evident nature, such as a plastic ring that breaks off when the cap is unscrewed. This provides evidence to store employees and consumers that the second code 920 (i.e., the one used to access a benefit) may have been compromised and hence, the ability to access the benefit may have been compromised as well. Some bottle caps 900 however do not have a tamper-evident feature and rely on a seal on the rim of the bottle separate from the cap 900. If the seal has been even partially separated from the bottle 1000, this serves as evidence that tampering may have occurred. Preferably, the first code 910 becomes unreadable if the cap has been loosened or removed (i.e., if someone has opened the bottle 1000 to view the second code 920).

In yet another embodiment (e.g., a manufacturing environment), the second code 920 may be printed using a photochromic or thermochromic ink so that the printed pattern is not visible under ambient conditions. Such ink can only be activated under intense light (intensity or specific wavelength) or at a high temperature which is generally not encountered in ambient conditions. During manufacturing, just before packaging or reading of this label, it may be subjected to these conditions so that the print is visible. The print may be read after this exposure before it fades away. One can tune bleach times after the exposure by appropriately selecting materials so that it lasts for a sufficient time to allow for reading. In yet another alternative, the inks used are luminescent (fluorescent or phosphorescent) or change color (e.g., as enabled by photochromic and luminescent inks from HW Sands Inc, Jupiter, Fla., United States), and optionally activated by wavelengths not found in ambient environments (e.g., UV less than 290 nm, γ-rays). Once such labels are exposed to these conditions, the print can be read. If luminescent inks are used, the print may be read in the dark. As discussed earlier, these inks may be encapsulated in order to avoid direct contact with food or to touch, and/or may be printed on the outside of the package to avoid the food contact completely.

In some embodiments, the first codes 910 and second codes 920 may be applied to canned beverages, e.g. soda, energy drinks, etc. The first code 910 may be printed on the surface of the can and the second code 920 may be printed on a part of the surface of the can that is completely or partially obscured by an article or feature of the can which is moved or removed by the consumer after the can is purchased, thereby revealing (i.e., no longer obscuring) the second code 920. A removable feature may alternatively be a label or sticker. The second code 920 may be hidden under a scratch-off layer. An example of a moveable feature may comprise a pull tab.

Specifically, in the case of a pull tab used to obscure a second code 920 printed on the top of a can, the can and/or the pull tab may preferably be configured in such a way that they prevent the pull tab from freely rotating, thereby preventing the second code 920 from being viewable/readable unless the pull tab is lifted and the can opened. The extrusion in the lid of the can, used to attach the pull tab, may be formed in an oval, rectangular, or other shape, such that a pull tab appropriately configured to fit the extrusion prevents the tab from rotating. The pull tab may be placed into an appropriately configured recess in the top of the cap 900 to prevent it from rotating. The pull tab may be adhered (glued), tacked, or spot-welded to the top of the can to prevent it from rotating. Additionally, the pull tab may be configured such that it abuts the edge of the top of the can in such a way that it will not allow the pull tab to rotate until it is lifted high enough to clear the lip of the can, and thereby open the can or otherwise indicate by its position that it has been moved and the second code 920 revealed.

The first codes 910 and second codes 920 may be complementary or additive in nature. Also, the first code 910 may be read while the second code 920 is hidden or unreadable. When the second code 920 is revealed it may be combined with the first code 910 to form a single readable code.

Multi-packs of items, such as soda or bottled water, may utilize a third code 1030 which can be associated with the individual items within the pack. Typically the codes for the individual items are not conveniently accessible by a code reader, and it would not be convenient to read the first codes 910 of the individual items at the point-of-sale. To address this case, codes from the individual items may be associated with a third code 1030 that is applied to the enclosure or packaging of the items contained within. In some embodiments, at a point-of-sale, only the third code 1030 is read. Through the association with its related first codes 910, the individual items are identified, and subsequently their associated second codes 920 can be identified and the benefits authorized.

In order to avoid confusion or uncertainty of the consumer over which code is the correct code to scan, the first code 910 may become unreadable, invisible, or otherwise marked as the wrong code to use for redeeming a benefit. The first code 910 may be covered with a label or sticker. This may be done as a step on the packaging line or subsequent to the packaging process and after the first codes 910 have been read and associated with the third code 1030.

Individual items may also utilize a third code 1030. A first code 910 may be printed on an item or on its label, and a second code 920 printed on a removable part of the item, such as a bottle cap 900, cork etc., such that the second code 920 is hidden until the removable part is removed. A third code 1030 may be printed on the packaging containing the item. The third code 1030 is associated with the item's first code 910 at the time the item is packaged. Through the association of the second code 920 to the first code 910, the second code 920 is thereby also associated with the third code 1030. The third code 1030 is read at the point-of-sale, and the benefit is subsequently authorized by way of its association with the second code 920.

At the point-of-sale, and after reading the first code 910 of an individual item, or the third code 1030 of a packaged individual item, it may be desirable to render the first code 910 unreadable in order to avoid confusion or uncertainty of the consumer over which code is the correct code to scan. It is desirable that the first code 910 become unreadable, invisible, covered with a label or sticker, or otherwise altered to indicate that it is the wrong code to use for redeeming a benefit. Means for accomplishing this, such as by using chromic materials and additional printing, are described in later paragraphs. Technologies discussed earlier may be used to accomplish this.

It may also be desirable to associate second codes 920 (i.e., hidden codes) directly with third codes 1030 printed on a package containing a multitude of items having individual second codes 920. The second codes 920 may be hidden until the item is opened, such as with a bottle cap 900, or the second codes 920 may be obscured by the items' packaging. At the point-of-sale the third code 1030 is read, and the second codes 920 may be directly associated with the third code 1030 so that the benefit may be authorized for each item.

In some embodiments, a system may comprise a database server and one or more databases, which at a minimum store the associations among the first 910, second 920 and third codes 1030. The codes may be generated and maintained on one or more servers in one or more secure environments by a trusted entity. Code associations (pairs and triads) may be formed by the generation of random code values or may be algorithmic with one or multiple keys. Codes may be communicated to and from manufacturers, retailers and the servers securely via the internet by means known in the art.

In an embodiment, code associations are transmitted to a manufacturer of an item or article onto which codes are to be printed, e.g., a label or a seal insert for a bottle cap 900. The first codes 910 and second codes 920 are paired and printed in a manner that ensures a correct pairing on a given article, such as can be done using a duplex printing process. In the event that a third code 1030 is utilized, as with a multi-pack, the first codes 910 are read as they are assembled into the final package, and the third code 1030 is printed on the package. The newly associated values of the first codes 910 and third codes 1030 are transmitted to the server and stored in the code database. The process can be similar irrespective of whether or not a first code 910 is actually used. For example, the second codes 920 may be read from the items prior to being placed inside the package, and the third code 1030 associated directly with the second codes 920.

Alternatively, a means may be given to the manufacturer to generate code pairs "on the fly"—for instance, by generating a third code 1030 after reading the first 910 and/or second codes 920 from items assembled into a multi-pack. These third codes 1030 and their associated first codes 910 and/or second codes 920 may then be transmitted to the server system and database.

At the point-of-sale, the first codes 910 or third codes 1030 may be read by the point-of-sale reader and transmitted to the database server system. The server system receives and recognizes code data coming from an authorized site and sales transaction. The point-of-sale system may further, if capable, render the first codes 910 unreadable. Upon subsequent receipt of the second codes 920 from the consumer, the server system may then authorize and provide the benefits.

Figure 11:
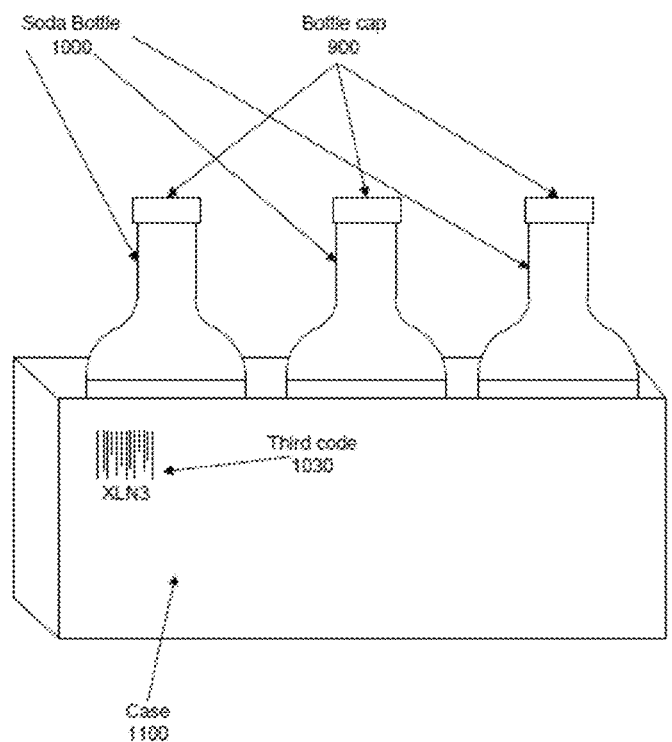
FIG. 11 is a sketch of an example soda bottle case bearing a third code, according to an embodiment.
Figure 12:
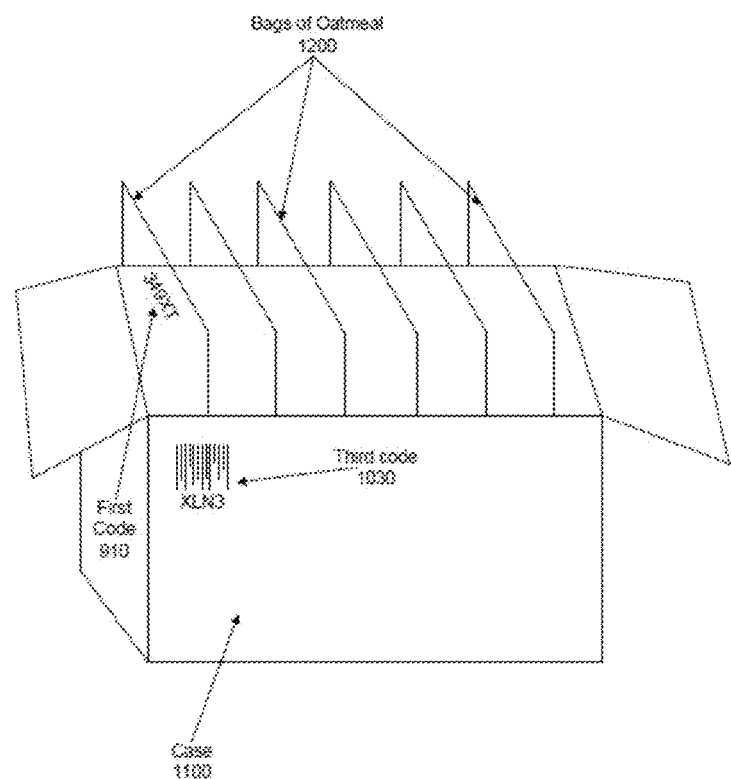
FIG. 12 is a sketch of an example oatmeal case bearing a third code, according to an embodiment.

A third code may be used in other situations. For example, a multitude of items (each with a first code 910 and a second code 920) may be associated with a single externally visible third code 1030 located on an article containing each of the items (e.g., upon a product package, bag, holder, or other such container). FIGS. 11 and 12 illustrate some examples.

FIG. 11 is a sketch of an exemplary soda bottle case bearing a third code, according to an embodiment. The soda bottle case 100 contains a plurality of soda bottles 1000 each topped with a respective bottle cap 900. The first code and second codes (not shown) may be printed on an article inserted inside each transparent bottle cap where the first code can be viewed externally through the bottle cap, and the second code read only when the bottle cap has been removed (as in the manner previously discussed with respect to FIGS. 9A and 9B). For a multi-pack of bottles 1000, each first code may be associated with a single third code 1030 printed on the package or case 1100 containing the items. This may be used at the retail point-of-sale to identify the particular item and/or authorize the second codes (not shown). In some embodiments, the association of the first codes with the third code may be performed during the packaging process in order to avoid mismatching (i.e., when the items/bottles to be contained within a specific article are known with a high degree of certainty). This may involve, for instance, reading the first code of each item immediately before the item is inserted, wrapped, or otherwise contained within the package or product case 1100.

FIG. 12 is a sketch of an exemplary oatmeal case 1100 bearing a third code 1030, according to an embodiment. A first code 910 and a second code 920 (not shown) may be printed on opposing sides of a material used to form individual packages (e.g., bags of potato chips or packets of oatmeal) of products that will in turn be packaged in a larger package (e.g., a box or bag of individual packages). After the individual packages have been assembled and filled with product (e.g. potato chips or oatmeal), the first code 910 is externally viewable while the second code 920 may only be read when the individual items (e.g., bags of oatmeal 1200) are opened. For a multi-pack of individual items, each first code 910 may be associated with a single third code 1030 printed on the package or case 1100 containing the items. This may be used, for example, at the retail point-of-sale to identify the item and/or authorize the second codes 920 located within each individual item. In some embodiments, the association of the first codes 910 with the third code 930 may be performed during the assembly process in order to avoid mismatching (e.g., when the items/bags 1200 to be contained within a specific article are known with a high degree of certainty). As before, this may involve, for example, reading the first code 910 of each item immediately before such an item is inserted, wrapped or otherwise contained within the package or product case 1100.

Note that in the preceding examples, the third code 1030 may be preprinted or printed at the time the individual items are contained within the package. It should also be noted that while printing may be used to apply codes to various items and articles, numerous other methods are possible within the scope disclosed here. These methods include (but are not limited to) etching, engraving, and molding processes.

In cases where the consumer may be confused as to whether they should use the first code 910, the second code 920, or the third code 1030 in order to access their benefit, in some embodiments, the first codes 910 may be altered so that they are no longer readable or recognizable after they have been associated with the third code 1030. Various means may be employed for altering such codes and/or the package used to contain them, and the alteration could take place before or after the items are contained within the package. In some embodiments, the alteration not only makes the first codes 910 unreadable, but is sufficient to remove the perception that such codes should even be read. In other embodiments, the first code may be specifically selected to be of a type that is not accessible or readable by the consumer.

In some applications it may be advantageous for a multitude of second codes 920 to be affixed to separate items associated with a single third code 1030 without the use of first codes 910. In some embodiments, the third code 1030 is externally visible and configured on a package that contains the individual items and prevents the second codes 920 from being read until opened or removed. For example, the second codes may be printed on the surface of cans of soda or beer, and associated with a single third code 1030 printed on the packaging that holds a 'six pack' of cans. The third code 1030 may be used at the point-of-sale to authorize the second codes 920 which are hidden until the package is removed by the consumer.

Three-Code Authentication Process Examples

Figure 13:
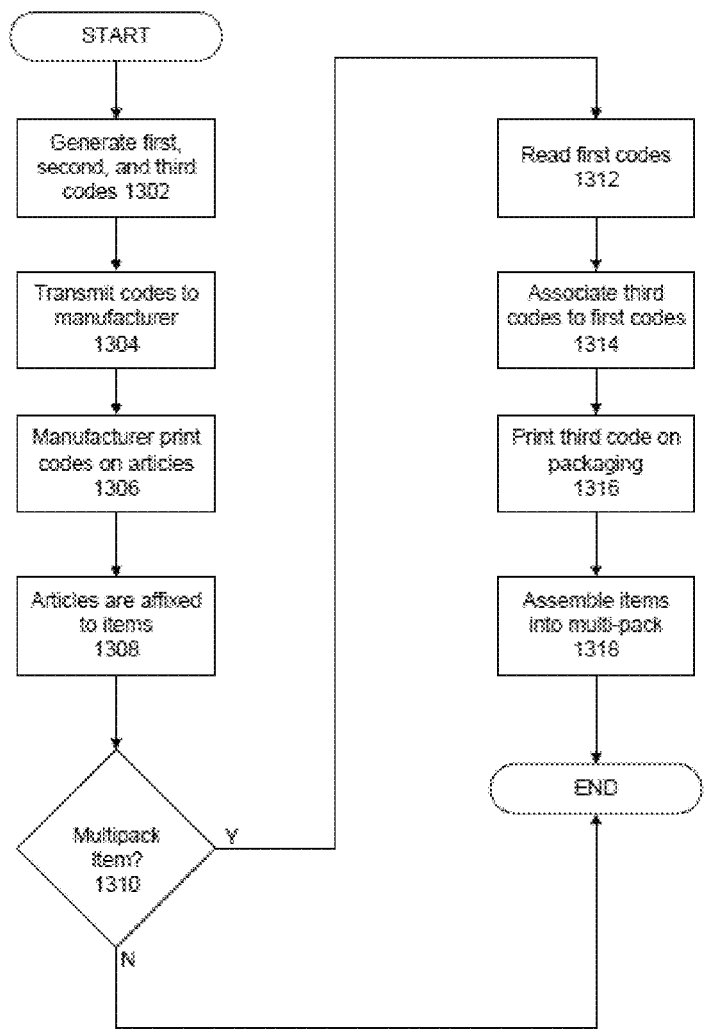
FIG. 13 illustrates an example process of packaging codes, which may be utilized by a manufacturer, according to an embodiment.

FIG. 13 is a flow diagram of an exemplary process of packaging codes, which may be utilized by a manufacturer, according to an embodiment. At block 1302, the first, second, and third codes are generated (for example, at key registry 212 depicted in FIG. 2). The codes may then be transmitted to the manufacturer at block 1304.

Next, at block 1306, the manufacturer may print the codes on either a surface of the item, a package containing the item, or on an article that is to be affixed to the item or its packaging. In some embodiments, duplex printing may be used to apply the first 910 and second 920 codes simultaneously or near-simultaneously in order to minimize errors in matching. The articles may then be affixed to the items at block 1308. At decision block 1310, in the event that the items are to be sold individually, the process then ends.

On the other hand, if the items are sold together, for example, as bundled in a multi-pack, a plurality of first codes may be read at block 1312 and associated with a third code at block 1314. The third code may then be printed on the packaging or an article to be affixed to the packaging at block 1316, and the items assembled into a multi-pack at block 1318.

Figure 14:
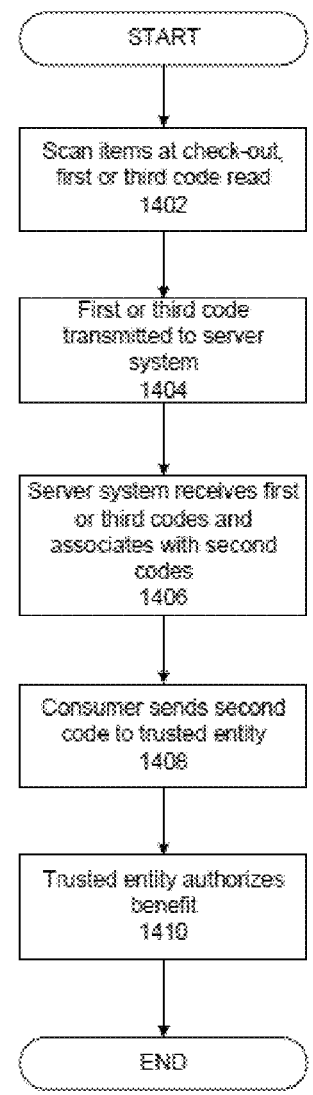
FIG. 14 illustrates an example process of processing code, which may be utilized by a retailer, according to an embodiment.

FIG. 14 is a flow diagram of an exemplary process of processing codes, which may be utilized by a manufacturer, according to an embodiment. At block 1402, items are read by a machine reader (for example, as read by a code scanner at a check-out), during which time the first code 910 or third code 1030 may be read.

The read code may then be transmitted to a server system at block 1404. In some embodiments, the server system may be a server or authentication node 100 (e.g., as depicted in FIGS. 1A and/or 1B). Once the read code has been successfully received, the server system may then associate the code with a second code at block 1406. When the consumer sends the second code to the trusted entity at block 1408, the trusted entity may then authorize the benefit at block 1410, and the process then ends.

In cases where the consumer might be confused as to which code is used to access a benefit (i.e., the code on the package or the code on an item contained by the package), the third code may be altered so that it is no longer readable after being read at the point-of-sale.

C. Content Authorization Service

In an embodiment, server(s) or authentication node 100 may provide a content authorization service (CAS), which melds the strengths of physical media distribution and online connectivity to provide new categories of media products that benefit studios, retailers, and consumers. The CAS creates an entirely new way for retailers, manufactures, and content providers to market and differentiate their entertainment products, bridge brick-and-mortar stores to Internet retailing, to reach selected users beyond the point-of-sale, and to capitalize on product-centric mobile and social media. For example:

Studios are able to create new retail products based on Blu-ray or similar technology that offer a lower price-point than traditional sell-through, but which requires no returns on unsold stock, and also allows for distribution of electronic rights, such as UltraViolet Rights Tokens, with a disc.

Retailers are able to merchandise these products in more ways and use locations that are effective in increasing sales, but which were previously precluded due to excessive theft.

Consumers have an opportunity to make a rental-style purchase that does not require return of the disc, yet offers a higher quality and more interactive experience than Video-on-Demand (VOD). When attached to the disc, consumers can conveniently have their electronic rights registered.

The CAS provides to consumers, on behalf of manufacturers and retailers, a digital benefit based on the individual items they purchase. These digital benefits are extremely flexible and can be conditioned on variables including, where, when, and from which retailer the item is purchased. Thus, the disclosed CAS has enormous potential and virtually unlimited opportunity to bridge creative sales and marketing initiatives between physical and online retail operations, and the manufacture of the products being sold.

Figure 15:
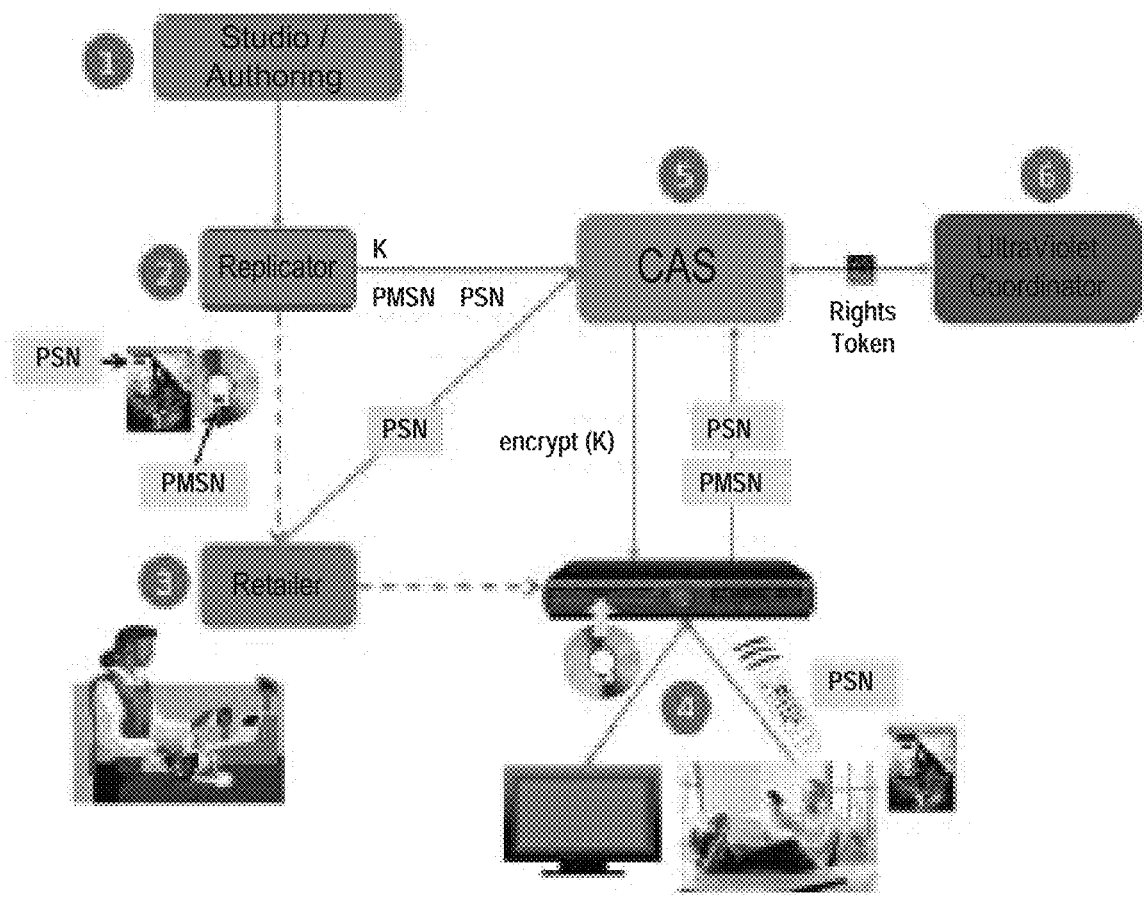
FIG. 15 illustrates an architecture and protocols for a content authorization service, according to an embodiment.

The basic architecture and protocols that define the CAS are shown in FIG. 15. A studio 1 authors the content according to the standard process for creating a Blu-ray disc, but adds functionality. For example, the functionality may comprise a BD-Java application included on the Blu-ray disc along with the content files. The disc contents are encrypted according to the Advanced Access Content System (AACS) specification for enhanced content, described below. This means that the media encryption keys are securely transmitted to the CAS, rather than being included on the disc with the content during replication.

After replication (e.g., at replicator 2), the discs are given a unique pre-recorded media serial number (PMSN), which is laser scribed in the Burst Cutting Area (BCA), and then packaged. The PMSN is used as a Disc Serial Number (DSN). Prior to shipping, each disc package is assigned a unique product serial number (PSN) that is located on the external packaging in a position where it is visible to both the retailer scanning system and to the consumer who purchases the disc.

The PMSNs and PSNs available for use in the manufacturing process may be provided to the replicator of the discs by the CAS, an operator of the CAS, or another entity. The replicator is responsible for transmitting to the CAS server a complete list of each of the disc PMSNs and the package PSNs used in the disc shipments of a specific title. Note that the CAS does not require the "pairing" of a specific PMSN with the PSN of the corresponding package.

In another instantiation, the PMSNs and PSNs may be generated using an encryption key provided to the replicator or packaging provider. In one method, the replicator or packaging provider will use this key as an initial seed, along with a counter, to generate each unique serial number. The counter may be incremented for each serial number generated, and then be added as part of the extended serial number. Given the initial seed and the counter, the CAS can validate that a serial number was generated by a particular encryption key. These encryption keys can be distinct for each universal product code. In this case, there is no requirement to provide PMSNs or PSNs to the CAS in advance. The CAS can validate that it is receiving a valid serial number of either type, and only grants rights based on those serial numbers if there has been a retail authorization of the PSN.

Retailer 3 displays the disc for sale and, because the disc remains locked and unplayable unless it passes through the point-of-sale system (e.g., point-of-sale device 102) to be registered as a legitimate purchase, the merchandising and display options are much more expansive as compared to standard Blu-ray disc sales.

When the purchase is made, the cashier may scan the outside label of the disc package to retrieve the PSN. The scanned PSN is then transmitted over network (e.g., network(s) 106) by the point-of-sale system to CAS 5 (e.g., server(s) or authentication node 100). This transmission may also comprise additional data, including the name of the retailer and the date, time, and place of purchase.

When the consumer places the disc in a connected Blu-ray player 4 (e.g., Profile 2.0 or higher), the on-disc application (e.g., BD-Java application) is loaded from the disc. Note that player 4 may comprise the user device 104 in FIGS. 1A and 1B. Player 4 reads the PMSN from the disc, and the consumer may be directed to enter the PSN from the disc packaging via an input device (e.g., physical or virtual keyboard, remote control, mouse or other pointing device, etc.). This input of the PSN may be performed through player 4, or through an application executing on another user device, such as a mobile application executing on a smart phone.

In addition, it is possible to generate an access code that is algorithmically linked to the PSN and printed on the inside of the packaging. In this case, the consumer may be prompted for the access code rather than the PSN. CAS 5 can determine that the access code is linked to the appropriate PSN by performing the algorithm on the PSN at the time that it is received from the retailer and saving that in a database. When the access code is returned from the consumer, this code is checked rather than the PSN, eliminating the requirement for the consumer directly to return the PSN. The algorithm linking the PSN and the access code can be performed at any time after which the CAS has access to the PSN.

One instantiation of an algorithm that can be used in this linkage would be for the printer to request a unique key ($K_{PSN}$) for each new universal product code (UPC). At the same time they would request an allocation of a count range ($D_{COUNT}$) to ensure a globally unique output value. Each PSN would be calculated as $=\text{AES-128E}(K_{PSN}\|D_{COUNT})$ where AES-128E is the Advanced Encryption Standard (AES) 128 bit encryption algorithm applied to the concatenation of the unique key and an incremented value within the count range. This output can be truncated to the most significant 39 bits (which can be represented in 12 digits) and concatenated with the 9 digit $D_{COUNT}$. This process is the same as used by AACS to generate "unguessable" PMSNs. In one instantiation, this method is further extended to create a linked access code. The access code would be generated by calculating AES-128E ($K_{PSN}$, PSN) and truncating the output to 10 decimal digits. A consumer would be prompted to provide the access code. CAS 5 would validate that this access code can be linked to a PSN that has been sold but not yet been activated. In one instantiation, the access code is calculated and stored in a database when the PSN is received from the authorized retailer. This would allow the validation of an access code at the time at which it is supplied by the consumer to be performed as a simple database lookup. If there is a database entry corresponding to the access code it would be authorized. Otherwise, it would be rejected by CAS 5. Clearly, other algorithms with similar attributes could be used in different instantiations both for generating PSNs and for linking PSNs with access codes.

Player 4 is directed to transmit the PMSN and/or PSN to CAS 5, which checks a database to confirm that the PSN value has been previously received from a retailer, thereby indicating that a valid purchase was made. The associated PMSN is stored so that in the future, the validated disc and purchase can be recognized and confirmed without the necessity for the consumer to re-enter the PSN. Having validated the disc purchase, the CAS 5 transmits the details of the rights offer(s) available to the consumer. This transmission may also comprise retailer branding information or other messaging, including retailer-specific messaging. Once the consumer selects the desired offer and satisfies any associated conditions (e.g., payments or customer information, etc.), the CAS 5 or other system securely transmits the required encryption keys to player 4. Player 4 can then decrypt the required keys, and use the decrypted keys to unlock the encrypted content on the disc, according to the terms of a license. Prior to unlocking the encrypted content, the consumer may be required to accept the license, for example, by indicating his or her understanding and acceptance of the terms of the license using an input device. Such click-wrap licenses are well-known in the art, and will not be described in detail herein.

It should be noted that there is no requirement for player 4 to be previously paired with or authenticated by CAS 5. The disc can authenticate CAS 5 through the use of a nonce that ensures that CAS 5 is in possession of the appropriate encryption keys. CAS 5 authenticates the disc and purchaser of the disc through the use of the PSN and/or access code coupled with the PMSN. The encryption keys are only returned to the player if the PSN is authenticated. The player can only play the content if it has the appropriately encrypted disc. In addition, there is no need for CAS 5 to ever be in possession of the unencrypted content.

While many Blu-ray discs are currently being sold with associated electronic rights, such as UltraViolet viewing rights, in the normal brick-and-mortar retail process the reliable identification of the retailer-of-record presents a significant challenge.

The disclosed CAS has certain knowledge of the retailer through the network interaction that must take place at the point-of-sale. If the studio has indicated to the CAS that an electronic right is associated with the sale of the disc title, then the CAS is able to act as a proxy for the retailer so as to have the right assigned to the consumer's rights locker with the correct identification of the retailer.

In an embodiment, the conditional access titles enabled by CAS 5 are compatible with current Internet-connected Blu-ray players having Profile 2.0 or greater. Aside from Internet connectivity, Profile 2.0 Blu-ray players are required to support AACS On-Line Enhanced Content features defined in the AACS specification. The conditional access to content encrypted on Blu-ray discs provided by CAS 5, may be implemented according to the AACS On-Line Enhanced Content specification, thereby ensuring the highest degree of player compatibility for CAS-enabled discs.

The AACS specification provides for two kinds of content: Basic Titles and Enhanced Titles. Normally, Blu-ray discs are authored as Basic Titles, in which case the encrypted title keys are already present on the disc, and may be readily processed using the AACS device keys in the player to give immediate access to viewing the title without the need for Internet access. Enhanced Titles differ in as much as they require an online connection and extended functionality in the player before "permission" is granted by a remote server to decrypt and view an Enhanced Title. CAS content may be authored according to the AACS On-Line specification for Enhanced Titles.

The AACS CPS Unit Usage File (CUF) on the disc denotes which titles require player 4 to obtain external permission or keys before it plays them. The Uniform Resource Locator (URL) of the remote server that can provide permission to play the title is specified by the BD-J application on the disc. In embodiments, the remote server is CAS 5, which may comprise server(s) and/or authentication node 100. Permissions may be either "instant" or "cacheable," both of which are stored in player 4.

Cacheable permissions may be stored in player 4 and used in the future to allow playback of the Enhanced Title without the necessity to reconnect to CAS 5. Cacheable permissions may be issued with attributes listed in the CUF, including, without limitation: i) the "period" of time that the permission may remain in the cache until it must be deleted, ii) an "after" date and/or time, before which a player may not play the Enhanced Title, and/or iii) a "before" date and/or time, after which a player may not play the Enhanced Title. In an embodiment, retailer use of CAS 5 may be a straightforward two-step process. Retailers may register with CAS 5 and interface with CAS 5 at the point-of-sale. During registration, a retailer may supply the Internet Protocol (IP) addresses used by its systems (e.g., point-of-sale systems) to transmit the PSN scanned at the point-of-sale to CAS 5. Alternatively, the retailer may exchange cryptographic keys with the CAS ensuring authorized and authenticated connections between the CAS and the retailer's point-of-sale. To facilitate the presentation of its brand to consumers, the retailer can also provide information, such as branding information (e.g., logo), that will be presented to consumers during the activation step (e.g., using the consumer's Blu-ray player or smartphone application). For example, the retailer's brand information and other information may be presented on a user interface, provided by CAS 5, through which the consumer inputs the PSN number for authentication.

As indicated above, a CAS-enabled product may have a unique PSN displayed as a code (e.g., alphanumeric code, barcode, etc.) on the product packaging (e.g., disc case). To read the PSN, the retailer simply defines the SKU as requiring two scans (similarly to the process used for gift cards today). The first scan reads the SKU, which initiates a notification to the cashier to perform a second scan on the PSN. The second scan reads the PSN, which is transmitted to CAS 5. This transmission allows CAS 5 to know that this product has been sold at the transmitting retail location. As a result, the product is authorized for use by the consumer. In addition, an association of the product to the retailer or retail location may be stored, to facilitate tracking and targeted marketing or other communications by the retailer.

Integration of a retailer's point-of-sale system or network can be through direct communication with CAS 5 (e.g., using web-based transactions), or through a gift-card network that a retailer may already have in place.

Creation of a CAS-enabled Blu-ray title requires minimal deviation from the well-established standard process that takes a digital master file of the title and results in Blu-ray-packaged media being offered for sale at retail outlets. The audiovisual content of the titles contained in discs may be authored as normal. The titles requiring CAS permission are identified as an AACS title set. All titles in a given title set may be encrypted with the same title key so that a single permission will suffice to allow access to all of the titles in the title set. In an embodiment, CAS-enabled title sets do not have the title key present on the replicated disc. The title keys for the CAS-enabled content are instead sent to CAS 5. When player 4 inspects the CUF file and identifies the presence of a CAS-enabled Enhanced Title and the corresponding CAS URL, it follows the process specified for AACS On-Line Enabled Content in order to receive permission to access and view the Enhanced Title. The permission may be granted by CAS 5 through CAS 5 transmitting the title key, which may be encrypted and which is otherwise unavailable on the disc, to player 4.

After replication, each CAS-enabled disc can be inscribed with a unique PMSN in the BCA of the disc. In addition, the disc packaging process may include a robust imprint of the PSN on the external packaging. The PSN may be printed in human-readable form, machine-readable form, both human and machine-readable forms, or in one form which is both human and machine-readable. As discussed above, the replicator may transmit complete and accurate lists of all PMSNs and PSNs associated with a specific title key associated with the CAS-enabled title to CAS 5 before the discs are made available to retail. In some embodiments, there may be a third code printed on part of the packaging that is not accessible prior to purchase without damage to the packaging, paired with the PSN, an Access Code, that has been or reliably can be linked to the PSN. In the discussion below, where the consumer is prompted for the PSN, the consumer optionally can be requested to provide either of these codes depending on the levels of security required by the system.

Figure 16:
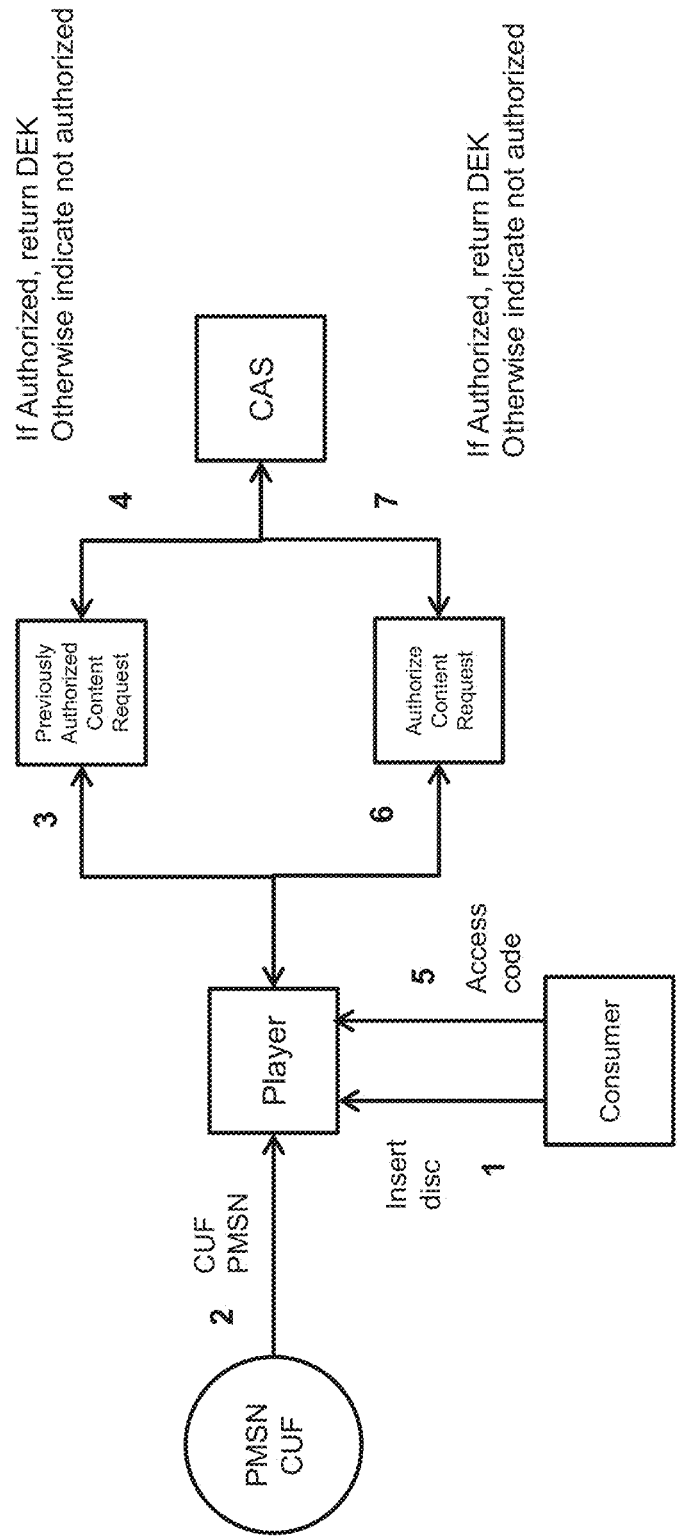
FIG. 16 illustrates example communications of an authorization process, according to an embodiment.

FIG. 16 illustrates example communications between the player application, the consumer, and the CAS, according to an embodiment. On attempted play, the application (e.g., in player 4) may first attempt to play the content. If the appropriate title key is not present in the player cache, player 4 may send a request to CAS 5 to determine whether this disc has previously been authorized. If it has, the title key will be returned by CAS 5 to player 4, and player 4 will use the title key to access the title. If the specific disc has not been previously authorized, the CAS will indicate this and the application (e.g., on player 4 or an application such as a smart phone application) will instead prompt the user for the PSN or its associated Access Code. This information will be received from the consumer and sent to CAS 5 in an Authorize Content Request. If the request is authenticated, CAS 5 will return the title key in its response. Otherwise, CAS 5 will notify the application that the request has not been authenticated.

CAS 5 may utilize secure mechanisms for storing, transferring, and accessing data. At the data-element level, high-value data may always be stored and transmitted in an encrypted form and over secure channels. Replicator 2 may encrypt the title key file for a CAS-enabled title, and transmit this file over a secure channel to CAS 5. CAS 5 then stores the encrypted title key file. Player 4 may transmit an authorization request to CAS 5, comprising a volume key, title identifier, and a nonce generated by the AACS secure layer. A nonce is an arbitrary number used only once in cryptographic communication. In an embodiment, when the authorization request is received by CAS 5, the encrypted title key can be retrieved (e.g., based on the title identifier) and passed to a hardware security module (HSM) of CAS 5, along with the volume key, title identifier, and nonce. The HSM may decrypt the encrypted title key using an internally stored CAS private key. The title key may then be re-encrypted using the volume key, title identifier, and the nonce. The encrypted title key is then transmitted by CAS 5 to player 4, where it can be processed and used to decrypt and play the title. This process protects the title key both during storage on CAS 5, as well as in transit between CAS 5, replicator 2, and player 4. In addition, all access to servers of CAS 5, data, and keys may be controlled using multi-factor authentication.

Figure 17:
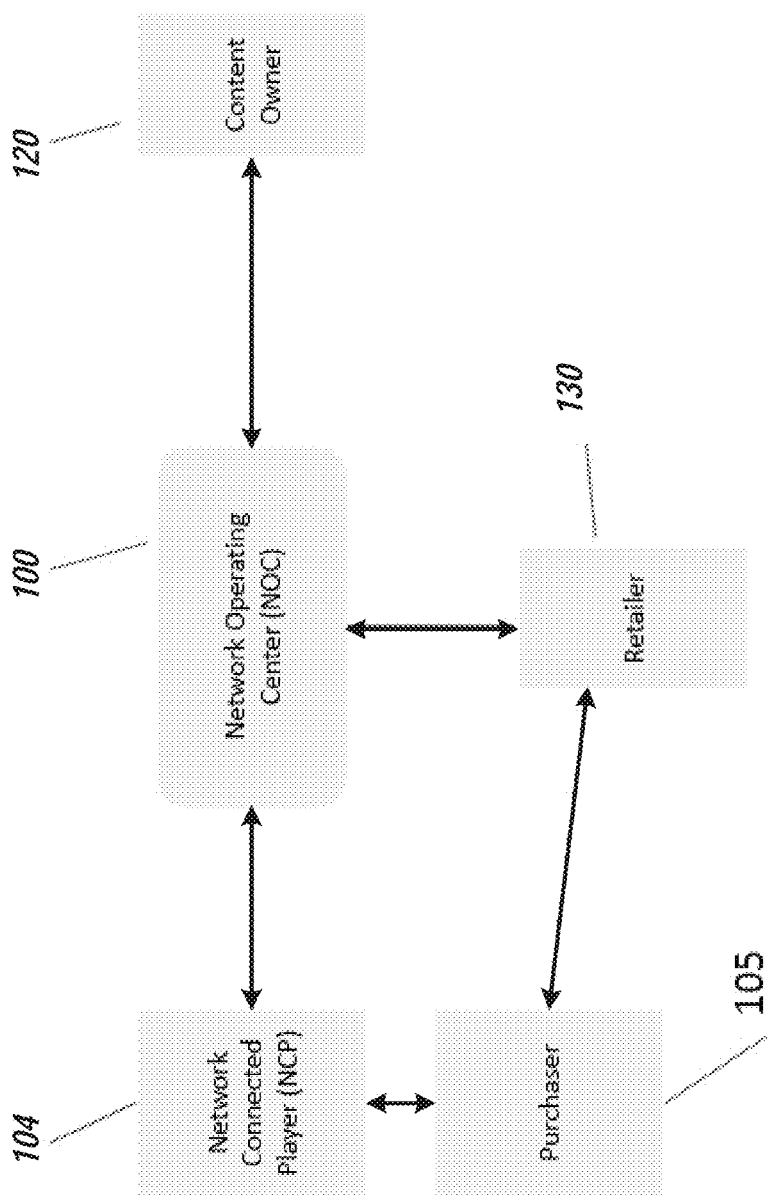
FIG. 17 illustrates participants in an authorization process, according to an embodiment.

FIG. 17 provides an overview diagram of the key participants in the system. Network-connected disc player (NCP) 104 interacts with Network Operating Center (NOC) 100. Content Owner 120 interacts with NOC 100 and retailer 130. Purchaser 105 interacts with retailer 130 and NCP 100.

Figure 18:
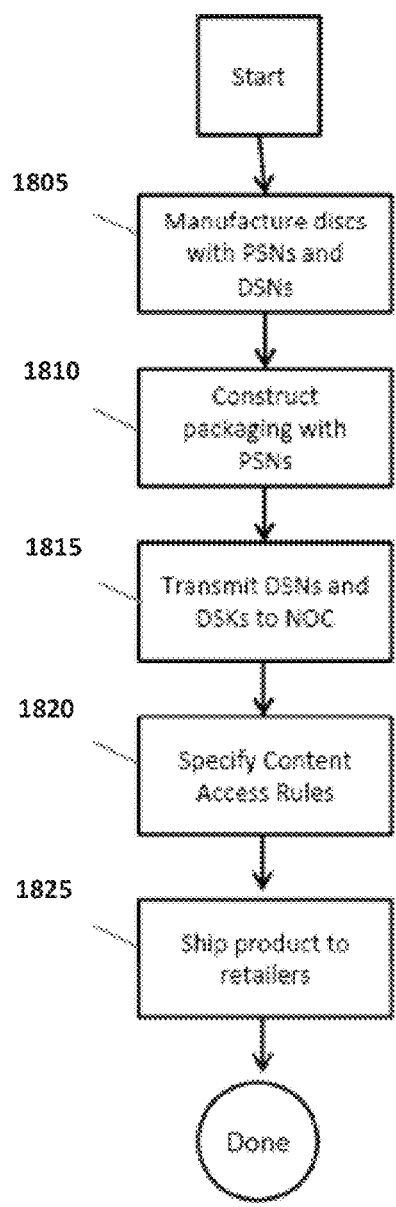
FIG. 18 illustrates a process, which may be used by a content owner, according to an embodiment.

When content owner 120 wishes to distribute an optical media product that is CAS-enabled, it may engage in the process illustrated in FIG. 18. The process begins in process step 1805 in which the content owner has discs with DSNs manufactured. The content on each disc can be encrypted with a DEK.

In process step 1810, the manufacturer constructs packaging that has been identified with PSNs. The discs are packaged with the uniquely labeled packaging and shipped to retailer 130 in step 1825. In addition, in step 1820, content owner 120 specifies to NOC 100 any additional rules associated with the provisioning of access to the content, and the process completes.

Figure 19:
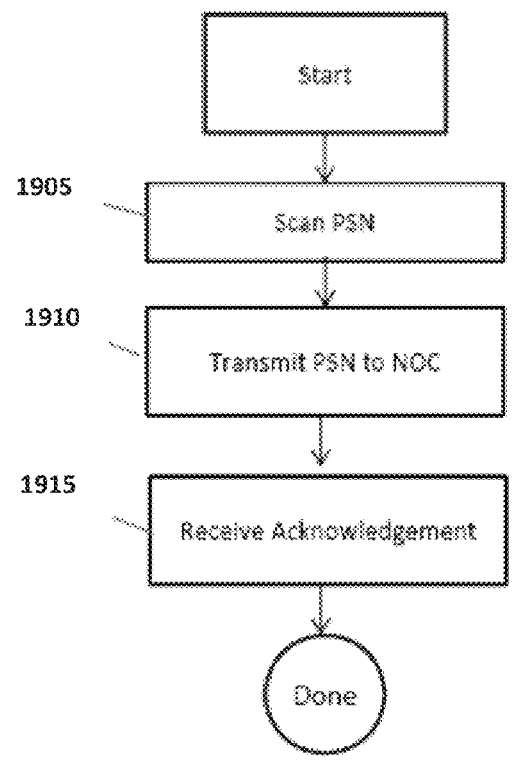
FIG. 19 illustrates a process, which may be used by a retailer or point-of-sale system, according to an embodiment.

FIG. 19 illustrates a process, which may be performed by a retailer of digital content. The process begins in process step 1905 in which the PSN is scanned at the point-of-sale. This scanned PSN is transmitted to NOC 100 in process step 1910. The retailer may wait for acknowledgement of receipt of the PSN by NOC 100 in step 1915, and subsequently completes the process.

Figure 20:
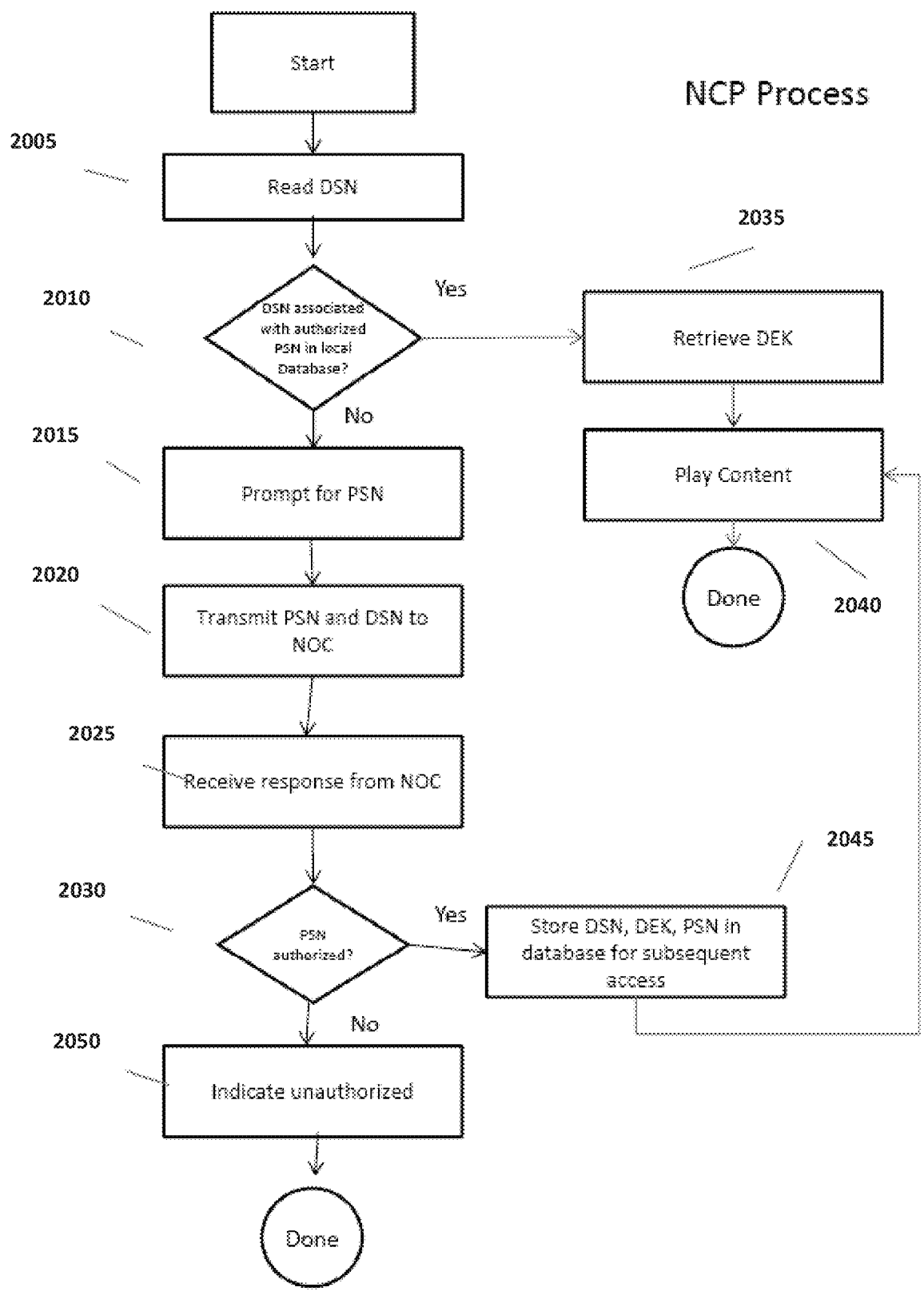
FIG. 20 illustrates a process, which may be executed by a network-connected player, according to an embodiment.

FIG. 20 illustrates a process performed by NCP 104. The process begins with process step 2005 reading the DSN. In this step, a disc has been inserted in NCP 104 and NCP 104 reads the DSN from the disc. In step 2010, NCP 104 checks whether the DSN is already associated with a PSN in its local database. If it is, the process proceeds to step 2035, and the DEK associated with the DSN is retrieved. The process the proceeds to process step 2035 in which NCP 104 plays the authorized content, thereby completing the process.

If the PSN was not found in NCP 104's local database, NCP 104 prompts the purchaser for the PSN in process step 2015. The provided PSN, along with the previously read DSN, are transmitted to NOC 100. NCP 104 receives the response to the request from NOC 100 in process step 2025. The process then proceeds to process step 2030, in which NCP 104 checks whether it received a positive response from NOC 100. If a positive response is received, NCP 104 stores the DSN, DEK, and PSN in its local database for subsequent access and the process proceeds to process step 2040, in which NCP 104 plays the content to complete the process.

If the response from NOC 100 to the request in process step 2030 was negative, the process proceeds to step 2050, in which NCP 104 provides a message to the purchaser that the disc has not been authorized, and the process completes.

Figure 21:
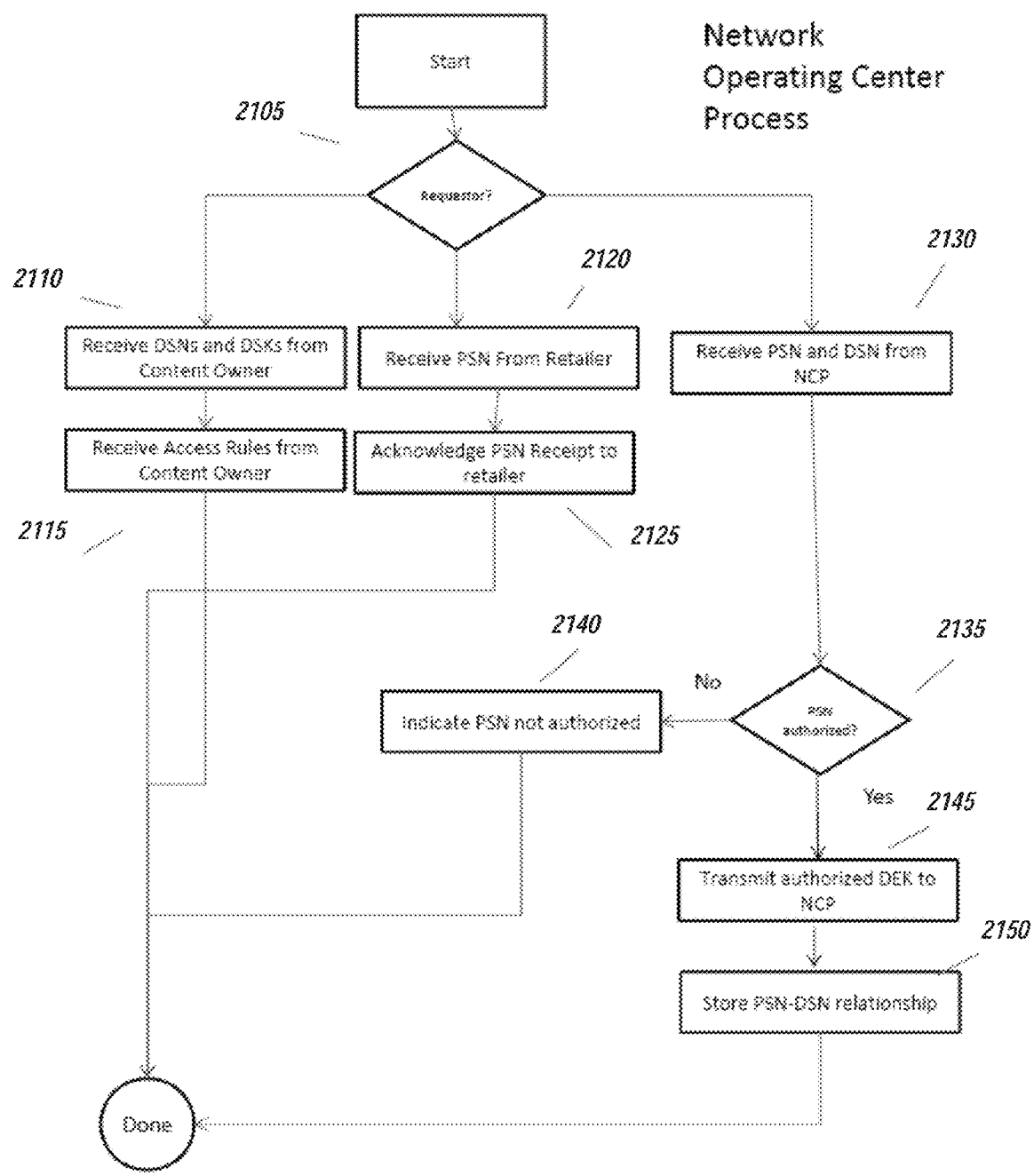
FIG. 21 illustrates a process, which may be executed by a network operation center, according to an embodiment.

FIG. 21 illustrates a process which may be performed by NOC 100. The process begins in process step 2105, in which NOC 100 determines the source of a request. If it is content owner 120, the process proceeds to process step 2110, in which DSNs and DSKs are received from content owner 120. In step 2110, NOC 100 receives the access rules associated with the disc from content owner 120. The process then completes.

If in step 2105 it is determined that the requestor is a retailer, NOC 100 receives the PSN from retailer 130, and provides a receipt acknowledgement to retailer 130 in process step 2125. The process then completes.

If in step 2105 it is determined that the requestor is NCP 104, the process proceeds to process step 2130, in which a PSN and DSN are received from NCP 104. The process then proceeds to process step 2135, in which NOC 100 determines whether the received PSN is authorized. NOC 100 makes this determination by applying the rules specified by content owner 120 in process step 2115. If the PSN is authorized, NOC 100 proceeds to transmit the authorized DEK to the NCP in process step 2145. This DEK may be different for different PSNs based upon the rights authorized by content owner 120. The process then proceeds to step 2150, in which the PSN-DSN relationship is stored in a database at NOC 100, and the process completes.

If in process step 2135 it is determined that the PSN is not authorized, the process proceeds to process step 2140, in which NOC 100 sends a response to NCP 104 indicating that the PSN was not authorized, and the process completes.

D. Product Authorization Service

In an embodiment, a method is provided for authorizing and registering rights and other benefits associated with purchased electronic products. These benefits can range from basic operation of the products to access to specific features that have been identified by the product manufacturer as being associated with conditions of the product's sale. These conditions can include the product retailer and the retailer's geographic location.

Many products are subject to high rates of theft. This theft lowers the effective profitability of the sale of the product for the retailer. To mitigate this problem, retailers typically take actions that can range from restricting access to the products by customers, to, in severe cases, ceasing the distribution of the high-theft product category. There have been solutions proposed to these problems. While many may mitigate this issue, none eliminate the problem or the resulting lost revenue for the manufacturers and retailers. In particular, existing theft prevention systems do not prevent the use of stolen products.

In addition to preventing theft, manufacturers would like to be able to better differentiate their products that are sold at different retail locations. Potential purchasers with different retailers or at different geographic locations may be motivated to purchase by different benefit bundles. Today, location or retailer-specific promotions entail custom packaging to differentiate the product offering or take the form of simple rebate processes.

What is needed is a system that will control the access to product features, and their associated rights or benefits, and ensure that only products sold at authorized retailers provide the expected benefits.

In an embodiment, retail transactions are linked to electronic products to ensure that access to benefits associated with the products is provided only when an authorized retail transaction has taken place (e.g., the specific product has been sold at an authorized retailer).

The electronic product may have the ability to interact with the product consumer or purchaser through some mechanism. These communication mechanisms can include an integrated display and interaction mechanism provided by the product (e.g., a TV display and remote control, or a microwave display), or an internal web server that communicates with a local computing device over a local network. The electronic product may also have the ability to store a limited amount of data in long-term memory (e.g., flash memory).

In the context of this embodiment, these electronic products can either be directly network-connected devices (NCDs), or non-network connected devices (NNCDs). NCDs can directly communicate over the Internet, whereas NNCDs require communication to the Internet, through the purchaser, using a computing device accessible by the purchaser, such as a personal computer or smart phone.

Each electronic product may be provided by the manufacturer with unique, item serial numbers (ISNs), product-package serial numbers (PPSNs), and item-specific secret keys (ISKs). The ISNs are stored internally in the product and are accessible during its operation. The PPSNs are printed on the product packaging in such a manner that they are accessible by the retailer at the point-of-sale. The ISK, or an associated cryptographic representation of an ISK, may be stored internally in the product. The presence of this key is used to determine access to the controlled benefits. Each ISN can have a unique ISK.

In an exemplary implementation, a unique item-level, product-packaging serial number (PPSN) formatted as an optical code (e.g. alphanumeric, barcode or QR code) may be placed on the outside of the product packaging. In addition, the ISKs, along with their associated ISNs, can be transmitted to a network operating center (NOC) by the product manufacturer. The manufacturer can also specify rules that apply to the benefits to be accessed via the NOC. These rules can be based on the retailer or the location of the point-of-sale. For example, a particular product feature may only be available to purchasers of the product in a particular geographic region, or for purchases made at a particular retailer. These features may vary by time or date of sale, as well. The manufacturer and or retailer may dynamically control the specific rights and the rules with respect to their provisioning. While it is an option, there is no requirement for the PPSN to be transmitted by the product manufacturer to the NOC. For purposes of validation, it may be beneficial for the PPSN to be transmitted to the NOC at some point during product distribution.

At the point-of-sale, the PPSN may be read by the retailer and transmitted to the NOC. At the NOC, the PPSN may then be marked as having been authorized. After purchase, the NCD is connected to the Internet. The NCD then determines whether it has received a PPSN from the purchaser. If it has not, it may prompt the purchaser for the PPSN. The purchaser may then supply the PPSN from the packaging to the NCD using a preferred communication path. In addition to those communication options outlined above, in one implementation the PPSN is scanned by a camera or other device coupled to the NCD. This implementation eliminates the requirement for the consumer to manually enter a code.

Once captured, the NCD transmits the PPSN and the ISN to the NOC. At the NOC, the status of the PPSN may be checked. If it has been received previously from an authorized retailer, the ISK for that specific item is returned to the NCD. If the PPSN has not been scanned and transmitted by an authorized retailer, the NOC can return a message to the NCD indicating that the item has not been authorized. In this case, ISK would not be returned and the protected benefits would remain inaccessible.

The key stored in the device by the manufacturer may be compared to the ISK provided by the NOC. If it matches, the product will enable the specified features and update its memory to indicate that it has been authorized. Alternatively, the NCD can be equipped with cryptographic capabilities, and the ISK can be stored as an encrypted field. The code returned from the NOC can be decrypted by the device to yield the ISK stored in the product by the manufacturer. In an exemplary implementation, this cryptographic solution is enabled using a public-key infrastructure where each NCD uses encryption keys that are specific to it or its product category. That is, a code returned from the NOC will be transformed into a different token for each device and mapped appropriately to the ISK stored on the device. With this approach, the ISK required to enable the device is not transmitted over the network.

Prior to this interaction, there is no requirement for the PPSN to have been associated with an ISN. During this interaction at the NOC, the PPSN is uniquely associated with this ISN. If the PPSN is subsequently received by the NOC with another ISN, the NOC will detect this and, according to the rules specified by the product manufacturer, will reject the request.

Once the NCD receives a valid ISK, the NCD may store the ISK, and bypass the requirement for the purchaser to enter the PPSN on subsequent uses. In this case, benefit access by the NCD may be automatic, subject to the rules specified by the product manufacturer at the NOC. Depending on the implementation, this subsequent use could be controlled by communication between the NCD and the NOC, or by processing rules that have been communicated by the NOC when the ISK was first returned to the NCD.

In another implementation, if the product is an NNCD rather than an NCD, then on powering up or upon request by the purchaser, the NNCD can communicate its ISN to the purchaser using its preferred communication mechanism. The purchaser can then provide the PPSN and the ISN to the NOC. If the PPSN is authorized, then the NOC will provide the ISK to the purchaser. The purchaser can then provide the ISK to the NNCD using its preferred communication mechanism. The NNCD then processes in the same manner as the NCD, authorizing benefit access if it receives the appropriate ISK.

In some cases, the product manufacturer may desire to associate specific ISNs with PPSNs. This association may be difficult because the product packaging may be created at different times and by different service providers than the product itself. In one embodiment, this mapping is enabled by packaging RFID-enabled cards on which has been encoded the ISN of the product. These cards can then subsequently be read at a convenient point in the supply chain after the product is packaged. At the same time, the packaging may be scanned. The ISN and PPSN can then be associated for use in later processing.

By providing a secure method for consumers to identify themselves as the purchasers of the product, through supplying the ISN on the RFID-enabled card along with the PPSN, this approach can also be used to enable other features and capabilities associated with the product. Certain embodiments can also be used for the registration of rights to an account. For example, the combination of PPSN and ISN can be used as a set of rights that can be associated with an account. In one implementation, the purchaser can access the NOC using a web service. The combination of PPSN and ISN can be used as credentials for accessing other rights associated with the product purchase. For example, if the purchaser associates this product purchase with an account at the NOC, a warranty registration can be automatically performed on his or her behalf.

Embodiments may also provide the manufacturer control over the access to the product benefits and limits unauthorized access. In addition, it provides benefits to retailers who can now sell a product that will be less appealing to thieves, and therefore generate a lower level of losses and higher product profitability.

Figure 22:
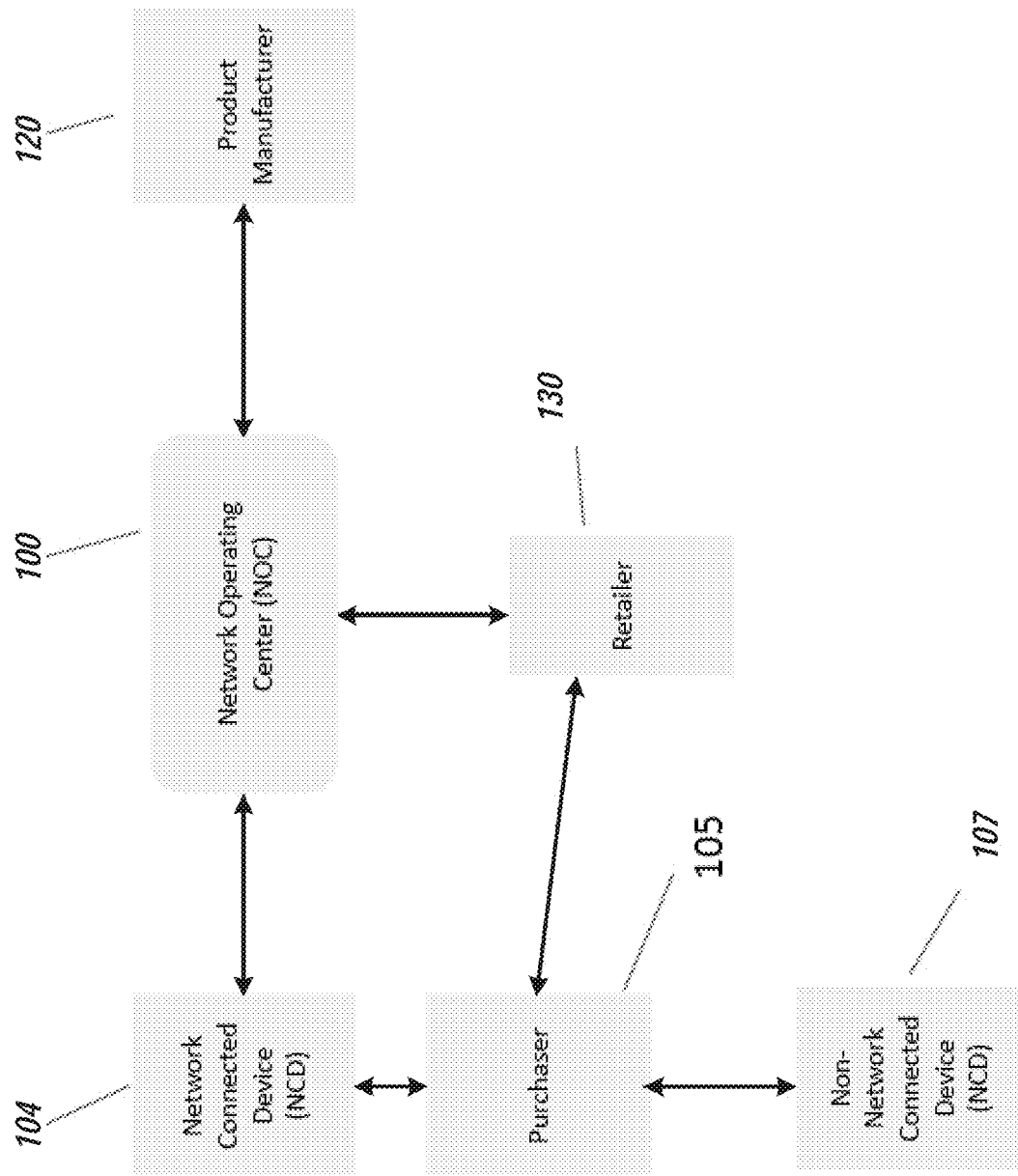
FIG. 22 illustrates participants in an authorization process, according to an embodiment.

FIG. 22 provides an overview diagram of the key participants in the system, according to an embodiment. Network-connected device (NCD) 104 interacts with Network Operating Center (NOC) 100. Product Manufacturer 120 interacts with NOC 102 and retailer 130. Purchaser 105 interacts with retailer 130 and NCD 104. Purchaser 105 also interacts with Non-Network-Connected Device (NNCD) 107.

Figure 23:
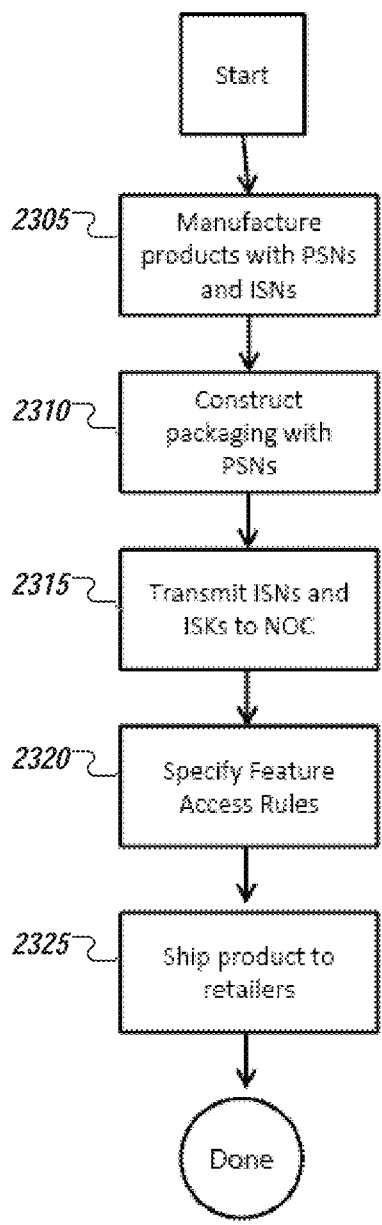
FIG. 23 illustrates a process, which may be used by a product manufacturer, according to an embodiment.

When product manufacturer 120 wishes to distribute a protected product, it may engage in the process illustrated in FIG. 23. This process begins in process step 2305, in which the manufacturer builds products that have ISNs.

In process step 2310, the manufacturer constructs packaging that has been labeled with PPSNs. The NCDs are packaged with the uniquely labeled packaging and shipped to retailer 130 in step 2325. In addition, in step 2320, product manufacturer 120 specifies to NOC 100 any additional rules associated with the provisioning of access to the product benefits, and the process completes.

Figure 24:
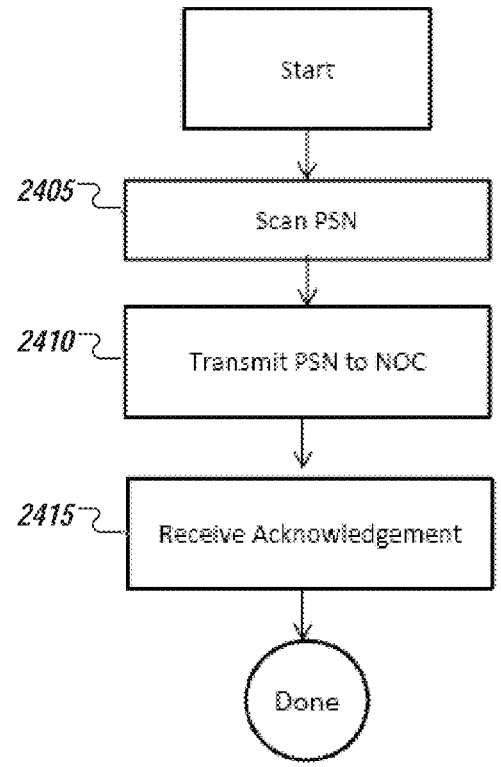
FIG. 24 illustrates a process, which may be used by a retailer or point-of-sale system, according to an embodiment.

FIG. 24 illustrates a process that may be performed by the retailer of the product. The process begins in process step 2405, in which the PPSN is scanned at the point-of-sale. This scanned PPSN is transmitted to NOC 100 in process step 2410. The retailer waits for acknowledgement of receipt of the PPSN by NOC 100 in step 241, and subsequently completes the process.

Figure 25:
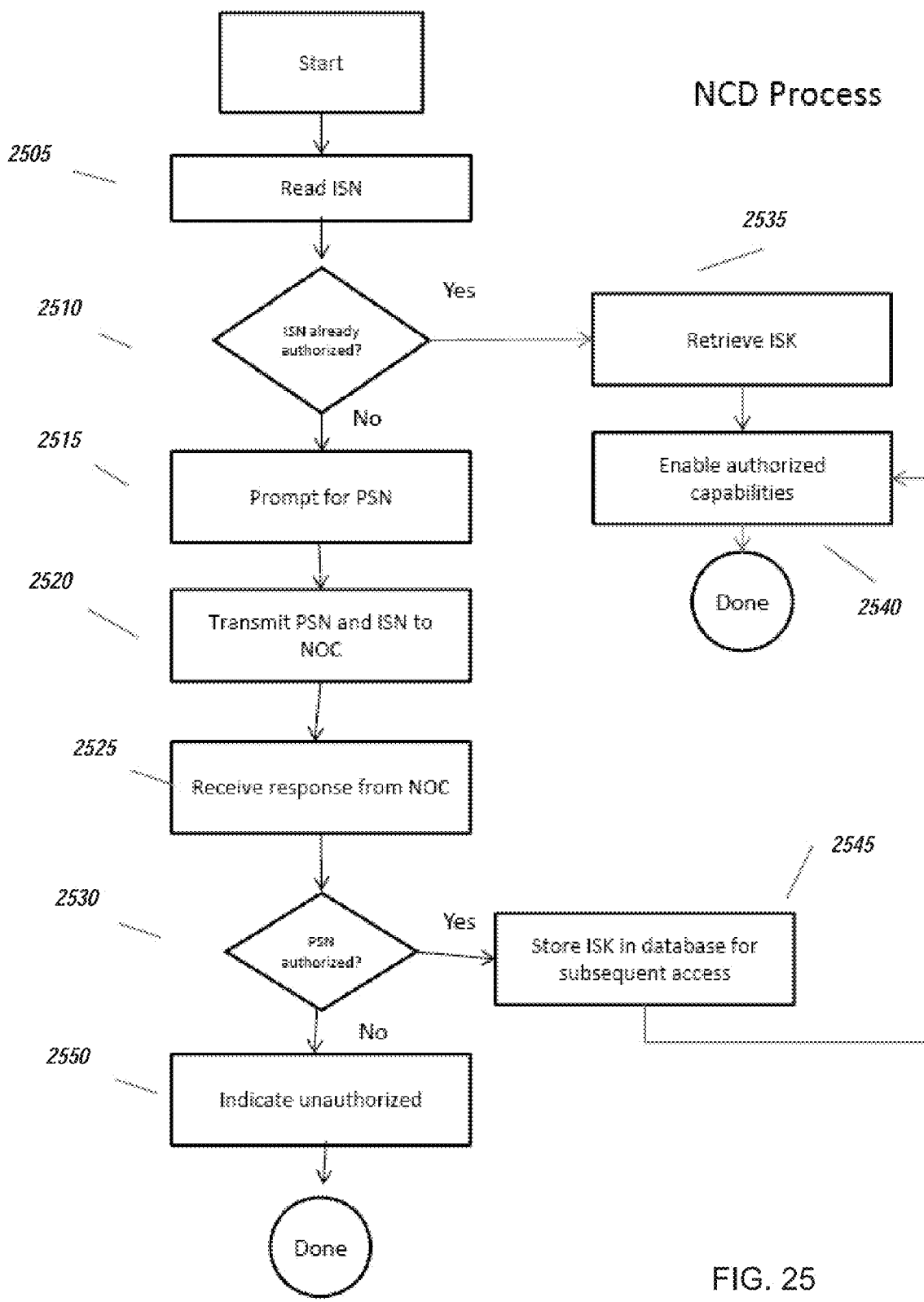
FIG. 25 illustrates a process, which may be executed by a network-connected device, according to an embodiment.

FIG. 25 illustrates a process, which may be performed or executed by NCD 104. The process begins with process step 2505. In this step NCD 104 reads the ISN. In step 2510, NCD 104 may check whether the ISN is already associated with a PPSN in its local database. If it is, the process proceeds to step 2535, and the ISK associated with the ISN is retrieved. The process then proceeds to process step 2535 and enables access to the controlled benefit, thereby completing the process.

If the PPSN was not found in NCD 104's local database, NCD 104 may prompt the purchaser for the PPSN in process step 2515. The provided PPSN, along with the previously read ISN are transmitted to NOC 100. NCD 104 receives the response to the request from the NOC in process step 2525. The process then proceeds to process step 2530, in which NCD 104 checks whether it received a positive response from NOC 100. If a positive response is received, NCD 104 stores the ISN, ISK, and PPSN in its local database for subsequent access, and the process proceeds to process step 2540, in which authorized capabilities are enabled, and the process completes. If the response from NOC 100 to the request in process step 2530 was negative, the process proceeds to step 2550, and the NOC 100 provides a message to the NCD 104 indicating that the NCD has not been authorized, and the process completes.

Figure 26:
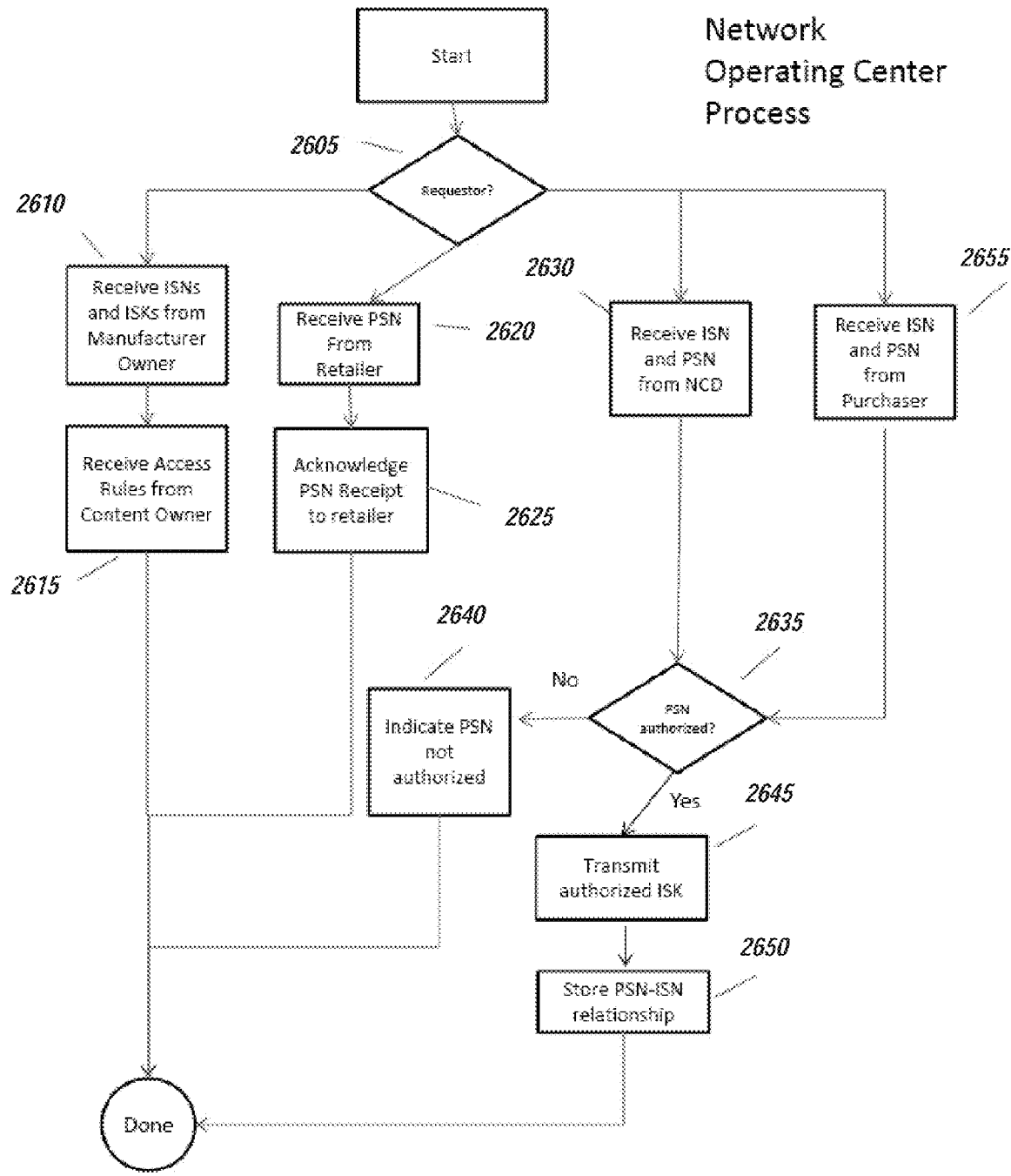
FIG. 26 illustrates a process, which may be executed by a network operation center, according to an embodiment.

FIG. 26 illustrates a process, which may be executed by NOC 100. The process begins in process step 2605, in which NOC 100 determines the source of the request. If the source is a product manufacturer 120, the process proceeds to process step 2610, in which NOC 100 receives ITNs, ISKs, and PPSNs from product manufacture 120. In step 2610, NOC 100 receives the access rules associated with the NCD from product manufacturer 120. The process then completes.

If it is determined in step 2605 that the requestor is a retailer 130, NOC 100 receives the PPSN from retailer 130, and optionally transmits a receipt acknowledgement to retailer 130 in process step 2625. The process then completes.

If it is determined in process step 2605 that the requestor is NCD 104, the process proceeds to process step 2630, in which NOC 100 receives the PPSN and ISN from NCP 104. The process then proceeds to process step 2635, in which NOC 100 determines whether this PPSN is authorized. It may make this determination by applying the rules specified by product manufacturer 120 in process step 2615. If the PPSN is authorized, the process proceeds to transmit the authorized ISK to NCP 104 in process step 2645. This ISK may be different for different PPSNs, based upon the rights authorized by product manufacturer 120. The process then proceeds to step 2650, in which the PPSN-ISN relationship is stored in a database at NOC 100, and the process completes.

If it is determined in step 2605 that the requestor is Purchaser 105, the process proceeds to step 2630, in which NOC 100 receives the PPSN and ISN from Purchaser 105. The process then proceeds to process step 2635, in which NOC 100 determines whether this PPSN is authorized. It may make this determination by applying the rules specified by product manufacturer 120 in process step 2615. If the PPSN is authorized, the process proceeds to transmit the authorized ISK in process step 2645. This ISK may be different for different PPSNs based upon the rights authorized by the content owner. The process then proceeds to step 2650, in which the PPSN-ISN relationship is stored in a database at NOC 100, and the process completes. If it is determined in process step 2635 that the PPSN is not authorized, the process proceeds to process step 2640, in which NOC 100 sends a response to NCD 104 indicating that the PPSN was not authorized, and the process completes.

Figure 27:
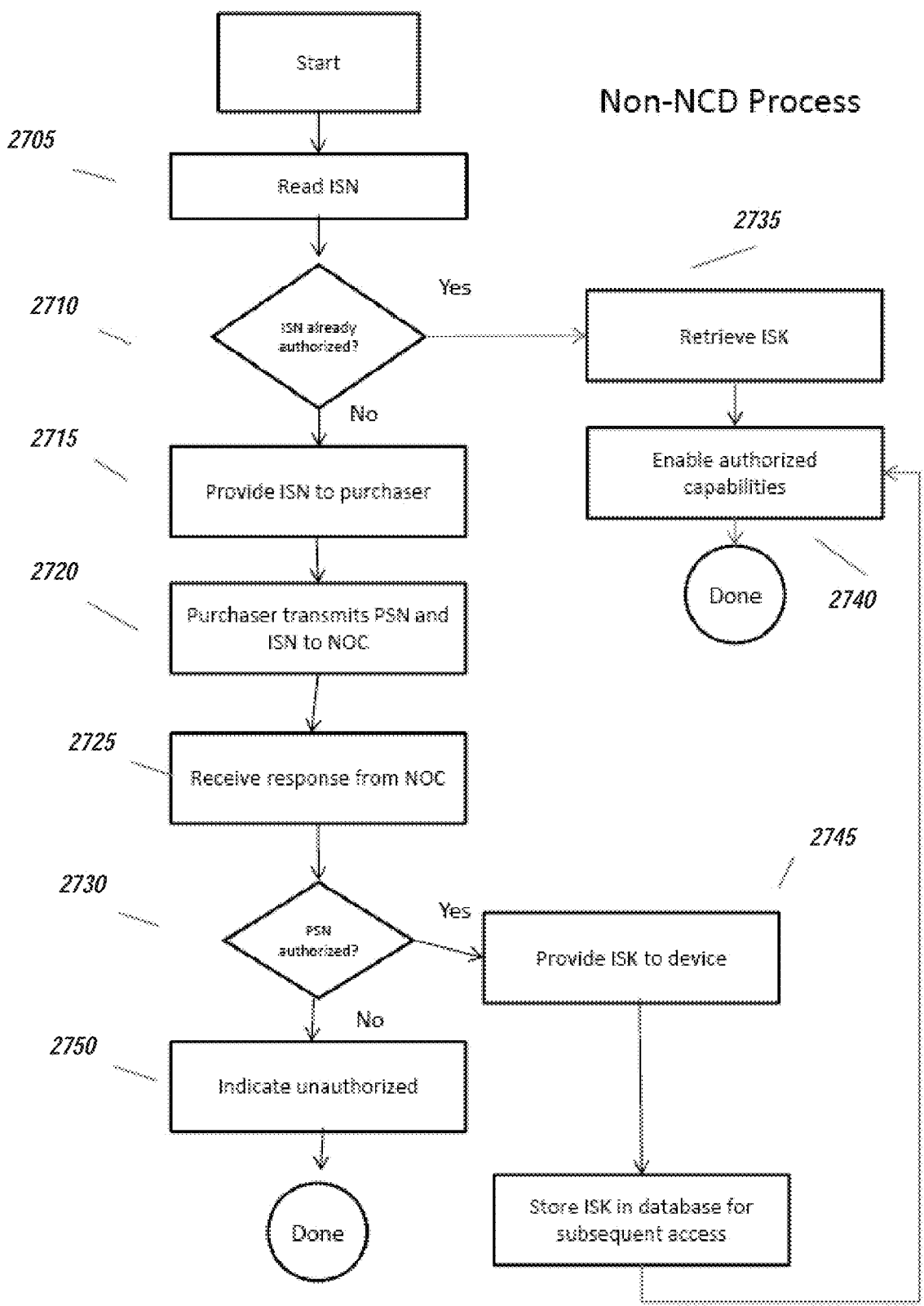
FIG. 27 illustrates a process, which may be executed by a non-networked electronic device, according to an embodiment.

FIG. 27 illustrates a process, which may be executed by NNCD 107. The process begins with process step 2705. In this step, NNCD 107 reads the ISN. In step 2710, NNCD 107 checks whether the ISN is already associated with a PPSN in its local database. If it is, the process proceeds to step 2735, and the ISK associated with the ISN is retrieved. The process then proceeds to process step 2735 and access to the controlled benefit is enabled. The process is then complete.

If the PPSN was not found in NNCD 107's local database, NNCD 107 provides the ISN to the purchaser in process step 2715. The provided ISN, along with the PPSN known to the purchaser, are transmitted to NOC 100. This Internet connection to NOC 100 is enabled by an Internet-connected computing device such as a PC or smart phone. The purchaser receives the response to his request from NOC 100 in process step 2725. The process then proceeds to process step 2730, in which purchaser 105 determines whether he or she received a positive response to his or her request from NOC 100. If a positive response is received, purchaser 105 provides the ISK to NNCD 107 in process step 2745. NNCD 107 stores the ISK and PPSN in its local database for subsequent access. The process then proceeds to process step 2740, in which the authorized capabilities are enabled, and the process completes.

If the response from NOC 100 to the request in process step 2730 was negative, the process proceeds to step 2750, and NOC 100 provides a message to the NNCD that the product has not been authorized, and process the process completes.

Additional Features

In an embodiment, benefits available for a product may change over time. For example, if the product is a Blu-ray disc, a consumer may be offered the ability to purchase or otherwise obtain access to additional content on the disc or downloaded or streamed from a remote source.

In an embodiment, the disclosed systems and methods advantageously allow a retailer to maintain a relationship with consumers that have purchased a product at the retailer, even after the purchase has been consummated. This relationship may be maintained through the consumer's association with the purchased product. For example, as discussed elsewhere herein, the first and second codes may be persistently stored in memory which is accessible by server(s) 100. In addition, when the first code is first transmitted to the server(s) 100 by a point-of-sale system, the point-of-sale system may also transmit an identifier of the retailer or retail location, which may also be persistently stored at server(s) 100 in such a way as to be associated with the first and second codes. Thus, retailers or individual retail locations may interact with consumers who have purchased products at the retailers using server(s) 100. These interactions may be product-specific and/or region-specific and may comprise offers, advertisements, or other communications. This may benefit both content providers/product manufacturers and retailers, since retailers have a greater incentive to promote products from the content providers/product manufacturers, since the retailer can acquire a persistent consumer relationship through the sale of such content/products.

In an embodiment, prior to authentication, a consumer may be required to agree to a license (e.g., end user license agreement), for example, using a click-wrap interface integrated into a user interface. In some embodiments, the consumer may only be required to agree to the license once, e.g., when a user device transmits the first code and second code to server(s) 100 for authentication. Alternatively, the consumer may be required to agree to the license on a per-device basis. For instance, if the product is a Blu-ray disc, when a network-connected player attempts to acquire the title key in order to play the content on the Blu-ray disc, it may be required to provide an identifier for itself (e.g., device identifier, IP address, combination of device identifier and IP address, etc.). This identifier may be unique, semi-unique, or non-unique, and may be stored in memory accessible to server(s) 100, such that it is associated with a particular product (e.g., via an association with the first and/or second codes transmitted during the authentication process). Thereafter, if server(s) 100 detect that a new player is being used to play the previously authenticated content, the user of the player (which may be the initial consumer or a subsequent purchaser) may be required to again agree to the license terms using a click-wrap interface.

In an embodiment, server(s) or authentication node 100 can act as a clearinghouse for all transactions between consumers, content providers, product manufactures, and/or retailers. For example, server(s) 100 may provide payment processing, such that consumers can purchase benefits through server(s) 100. In addition, consumers may receive title keys through server(s) 100, receive content through server(s) 100, receive communications from retailers or content providers through server(s) 100, etc.

The license aspect is an important aspect that will be described in more detail here. It is well known that when a user attempts to use certain products or access certain content to have click through type of license be presented and to require that the user accept the terms of the license before being allowed to use the product, access the content, etc. In the system and methods described herein, however, agreement with the terms of the license is more directly or more properly tied to a key or other authentication mechanism that then allows the user to use the product, access the content, access certain rights, etc. Thus, when certain codes are provided or options for access selected, a click through license can be presented to the user. Only once the user has agreed to the terms, will the user, or the user's device be provided the key or authentication mechanism needed to access, e.g., the digital rights associated with the user's purchase.

The license can include such limitation as a limitation on allowing someone else access to the, e.g., digital rights, or at least limit the user's ability to provide such rights for economic gain. The license can also include limitations on the user's ability to copy, reverse engineer, or otherwise redistribute the, e.g., digital rights. But again, it is the user's access to the key or activation mechanism that is dependent on the user accepting the license terms.

As discussed above, if the user attempts to access the digital rights via a new device or machine, i.e., a different computer or disc player, the license can be presented again or provisions can be made to allow the user to access the digital rights without the need to again accept the license terms. In some instances, the user may only be allowed to access the digital rights on a certain device or machine.

Example Processing Device

Figure 28:
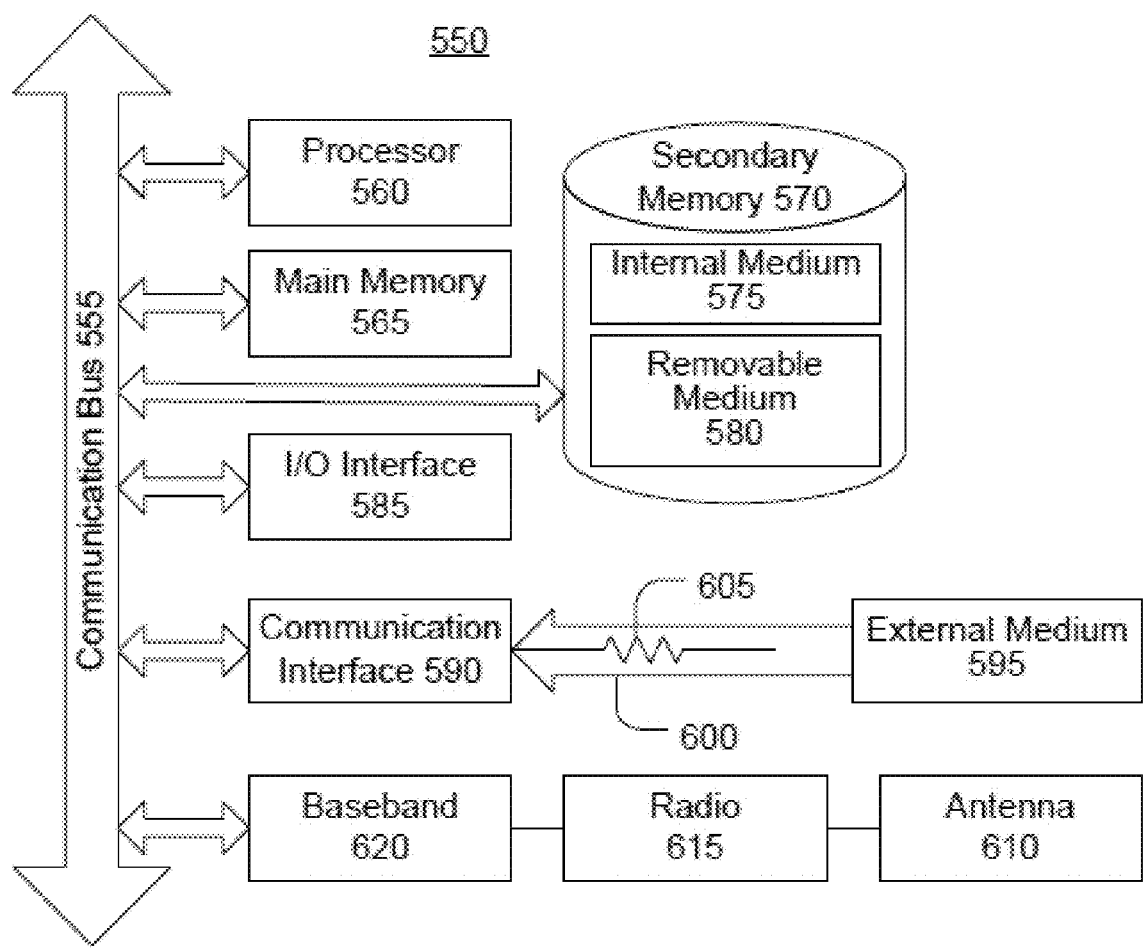
FIG. 28 illustrates a processing system on which one or more of the processes described herein may be executed, according to an embodiment.

FIG. 28 is a block diagram illustrating an example wired or wireless system 550 that may be used in connection with various embodiments described herein. For example the system 550 may be used as or in conjunction with one or more of the mechanisms or processes described above, and may represent components of server(s) 110, user system(s) 130, and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Pearl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 may be a non-transitory computer-readable medium having stored thereon computer executable code (i.e., software) and/or data (e.g., for implementing at least a portion of the subject matter described herein). The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions, such as those described herein.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components may comprise an antenna system 610, a radio system 615, a baseband system 620, or any combination thereof. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components.

In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions, such as those described herein. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for managing digital rights, comprising:
 a database configured to store access keys associated with access rights;
 a point of sale system configured to read and transmit a first serial number associated with an item;
 a user device configured to read and transmit a second serial number associated with the item and to read or receive the first serial number and to transmit the first serial number; and
 a server coupled with the database, the server configured to:
 receive the first serial number from the point of sale system, store the first serial number in the database,
 receive the first serial number from the user device,
 compare the first serial number received from the user device with the stored first serial number and confirm a match,
 receive the second serial number from the user device and associate it with the stored first serial number,
 identify a corresponding access key based on the combination of the first and second serial numbers, and
 transmit the identified access key to the user device such that the user device can then provide access to certain access rights associated with the item.

2. The system of claim 1, wherein the user device is configured to read or receive a third serial number associated with the item and to transmit the third serial number to the server, and wherein the server is configured to associate the second and third serial numbers with the first serial number and identify a corresponding access key based on the combination of the first, second, and third serial numbers.

3. The system of claim 1, wherein the database is further configured to store valid first serial numbers associated with access keys, and wherein the server is configured to compare the first serial number received from the point of sale system with the stored valid first serial numbers to confirm that the serial number received is valid.

4. A computer-implemented method for managing digital rights, comprising:
 receiving, from a source, a first code associated with an item;
 receiving, from a second source, another first code and a second code associated with the item, wherein the another first code is a third code;
 evaluating whether the first code is associated with the third code;
 associating the second code with the first code based on a result from the evaluation;
 identifying an access key, and
 transmitting the access key to the second source, the access key is for accessing one or more rights associated with the item.

5. The method of claim 4, wherein the access key is based on the combination of the first and second codes.

6. The method of claim 4, wherein the first code is associated with a media storage which is the item, and the one or more rights comprises a right to access content of the media storage.

7. The method of claim 6, wherein the right to access the content is limited to a time period, a number of access, or both.

8. The method of claim 4, wherein the first code is associated with a media storage which is the item, and the one or more rights comprises a right to access content not stored on the media storage.

9. The method of claim 4, wherein the one or more rights comprises an option to purchase additional benefits associated with the item.

10. The method of claim 4, wherein the access key is based on the combination of the first, second, and third codes.

11. The method of claim 4, further comprising: storing one or more of the first code, the third code, the second code, the result, the access key, and information associated with the one or more rights.

12. At least one computing device comprising storage and a processor configured to perform:
 receiving, from a source, a first code associated with an item;
 receiving, from a second source, another first code and a second code associated with the item, wherein the another first code is a third code;
 evaluating whether the first code is associated with the third code;
 associating the second code with the first code based on a result from the evaluation;
 identifying an access key, and transmitting the access key to the second source, the access key is for accessing one or more rights associated with the item.

13. The at least one computing device of claim 12, wherein the access key is based on the combination of the first and second codes.

14. The at least one computing device of claim 12, wherein the first code is associated with a media storage which is the item, and the one or more rights comprises a right to access content of the media storage.

15. The at least one computing device of claim 14, wherein the right to access the content is limited to a time period, a number of access, or both.

16. The at least one computing device of claim 12, wherein the first code is associated with a media storage which is the item, and the one or more rights comprises a right to access content not stored on the media storage.

17. The at least one computing device of claim 12, wherein the one or more rights comprises an option to purchase additional benefits associated with the item.

18. The at least one computing device of claim 12, further comprising:
   storing one or more of the first code, the third code, the second code, the result, the access key, and information associated with the one or more rights.

19. The at least one computing device of claim 12, wherein the access key is based on the combination of the first, second and the third codes.

* * * * *